US007588494B2

(12) United States Patent
Hughs-Baird et al.

(10) Patent No.: US 7,588,494 B2
(45) Date of Patent: Sep. 15, 2009

(54) GAMING DEVICE HAVING A HIGH-LOW GAME

(75) Inventors: Andrea C. Hughs-Baird, Reno, NV (US); Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 969 days.

(21) Appl. No.: 10/655,871

(22) Filed: Sep. 5, 2003

(65) Prior Publication Data

US 2005/0054411 A1 Mar. 10, 2005

(51) Int. Cl.
*A63F 13/02* (2006.01)
*A63F 13/10* (2006.01)

(52) U.S. Cl. .......................................... 463/16; 463/20

(58) Field of Classification Search ................. 273/269, 273/270, 292; 463/11-13, 16-20
See application file for complete search history.

(56) References Cited

U.S. PATENT DOCUMENTS

| | | | | |
|---|---|---|---|---|
| 2,545,644 | A | 3/1951 | Benton et al. | |
| 3,825,255 | A * | 7/1974 | Kennard et al. | 273/139 |
| 4,410,178 | A | 10/1983 | Partridge | |
| 4,448,419 | A | 5/1984 | Telnaes | |
| 4,624,459 | A | 11/1986 | Kaufman | |
| 4,836,546 | A | 6/1989 | Di Re et al. | |

(Continued)

FOREIGN PATENT DOCUMENTS

| | | |
|---|---|---|
| DE | WO 00/12186 | 3/2000 |

(Continued)

OTHER PUBLICATIONS gscentral.net/dice.htm, of Aug. 22, 2004, Price is Right Dice Game, downloaded from, web.archive.org/web/20040822075604/http://gscentral.net/dice.htm on Aug. 19, 2007.*

(Continued)

*Primary Examiner*—Peter DungBa Vo
*Assistant Examiner*—Matthew D Hoel
(74) *Attorney, Agent, or Firm*—K & L Gates LLP

(57) ABSTRACT

A gaming device wherein the game generates a masked target number or symbol that is formed from a plurality of component numbers or symbols. As the game is played, the gaming device generates and displays a first prediction number that relates to a first component number of the target number. If the generated first prediction number matches (i.e., is the same number as) the first component number of the target number, the first component number of the target number is revealed to the player and the player is provided an award based on the displayed first component number of the target number and at least one modifier. If the generated first prediction number does not match the first component number of the target number, the gaming device enables the player to input a prediction regarding the first component number wherein the prediction is based on the generated first prediction number. If the player's prediction is correct, the gaming device reveals the first component number of the target number and the player is provided an award based on the first component number of the target number. If the player's prediction is not correct, the gaming device reveals the first component number of the target number and proceeds as described above, to the next unrevealed component number, if any until each component number is revealed wherein a greater modifier is used for each provided award.

30 Claims, 16 Drawing Sheets

U.S. PATENT DOCUMENTS

| | | | | |
|---|---|---|---|---|
| 5,072,946 | A | 12/1991 | Miller | |
| 5,154,420 | A | 10/1992 | Gutknrecht | |
| 5,294,128 | A * | 3/1994 | Marquez | 273/292 |
| 5,324,041 | A | 6/1994 | Boylan et al. | |
| 5,344,145 | A | 9/1994 | Chadwick et al. | |
| 5,362,052 | A | 11/1994 | Kubatsch | |
| 5,490,670 | A | 2/1996 | Hobert | |
| 5,524,888 | A | 6/1996 | Heidel | |
| 5,628,514 | A * | 5/1997 | Nguyen et al. | 273/292 |
| 5,647,798 | A | 7/1997 | Falciglia | |
| 5,664,999 | A | 9/1997 | Kurihara | |
| 5,788,573 | A * | 8/1998 | Baerlocher et al. | 463/16 |
| 5,810,663 | A * | 9/1998 | Bochichio et al. | 463/13 |
| 5,855,514 | A | 1/1999 | Kamille | |
| 5,885,157 | A | 3/1999 | Harada et al. | |
| 5,928,081 | A * | 7/1999 | Bochichio et al. | 463/13 |
| 5,954,336 | A | 9/1999 | Goossens et al. | |
| 5,964,463 | A | 10/1999 | Moore, Jr. | |
| 5,988,643 | A | 11/1999 | Awada | |
| 6,015,346 | A | 1/2000 | Bennett | |
| 6,033,307 | A | 3/2000 | Vancura | |
| 6,089,976 | A | 7/2000 | Schneider et al. | |
| 6,102,403 | A * | 8/2000 | Kaufman | 273/292 |
| 6,102,798 | A | 8/2000 | Bennett | |
| 6,120,377 | A | 9/2000 | McGinnis, Sr. et al. | |
| 6,135,882 | A | 10/2000 | Kadlie | |
| 6,142,874 | A | 11/2000 | Kodachi et al. | |
| 6,142,875 | A | 11/2000 | Kodachi et al. | |
| 6,146,271 | A | 11/2000 | Kudlic | |
| 6,159,095 | A | 12/2000 | Frohm et al. | |
| 6,159,096 | A | 12/2000 | Yoseloff | |
| 6,159,097 | A | 12/2000 | Gura | |
| 6,159,098 | A | 12/2000 | Slomiany et al. | |
| 6,168,523 | B1 | 1/2001 | Piechowiak et al. | |
| 6,173,955 | B1 | 1/2001 | Perrie et al. | |
| 6,174,235 | B1 | 1/2001 | Walker et al. | |
| 6,179,711 | B1 | 1/2001 | Yoseloff | |
| 6,190,255 | B1 | 2/2001 | Thomas et al. | |
| 6,203,429 | B1 | 3/2001 | Demar et al. | |
| 6,213,876 | B1 | 4/2001 | Moore, Jr. | |
| 6,224,483 | B1 | 5/2001 | Mayeroff | |
| 6,231,442 | B1 | 5/2001 | Mayeroff | |
| 6,270,411 | B1 | 8/2001 | Gura et al. | |
| 6,296,568 | B1 | 10/2001 | Tracy | |
| 6,305,686 | B1 | 10/2001 | Perrie et al. | |
| 6,309,300 | B1 | 10/2001 | Glavich | |
| 6,312,334 | B1 | 11/2001 | Yoseloff | |
| 6,315,660 | B1 | 11/2001 | DeMar et al. | |
| 6,315,664 | B1 | 11/2001 | Baerlocher et al. | |
| 6,322,309 | B1 | 11/2001 | Thomas et al. | |
| 6,336,860 | B1 | 1/2002 | Webb | |
| 6,398,220 | B1 | 6/2002 | Inoue | |
| 6,406,369 | B1 * | 6/2002 | Baerlocher et al. | 463/20 |
| 6,419,579 | B1 | 7/2002 | Bennett | |
| 6,461,241 | B1 | 10/2002 | Webb et al. | |
| 6,475,085 | B2 * | 11/2002 | Moody | 463/17 |
| 6,481,713 | B2 | 11/2002 | Perrie et al. | |
| 6,506,118 | B1 | 1/2003 | Baerlocher et al. | |
| 6,514,141 | B1 | 2/2003 | Kaminkow et al. | |
| 6,565,084 | B1 | 5/2003 | Katz et al. | |
| 6,602,135 | B1 | 8/2003 | Gerrard | |
| 6,604,740 | B1 | 8/2003 | Singer et al. | |
| 6,616,142 | B2 | 9/2003 | Adams | |
| 6,722,983 | B2 | 4/2004 | Kaminkow et al. | |
| 6,746,328 | B2 | 6/2004 | Cannon et al. | |
| 6,761,353 | B2 | 7/2004 | Berman et al. | |
| 6,780,107 | B2 | 8/2004 | Baerlocher et al. | |
| 6,814,665 | B2 | 11/2004 | Seelig et al. | |
| 2001/0003098 | A1 * | 6/2001 | Moody | 463/17 |
| 2002/0135129 | A1 * | 9/2002 | Tarantino | 273/292 |
| 2002/0187827 | A1 | 12/2002 | Blankstein | |
| 2003/0036421 | A1 * | 2/2003 | Moody | 463/17 |
| 2003/0104852 | A1 | 6/2003 | Duhamel | |
| 2003/0153378 | A1 | 8/2003 | Schlegel et al. | |
| 2004/0219973 | A1 | 11/2004 | Cannon et al. | |
| 2005/0032565 | A1 | 2/2005 | Cheng et al. | |
| 2005/0059448 | A1 | 3/2005 | Sims et al. | |

FOREIGN PATENT DOCUMENTS

| | | | |
|---|---|---|---|
| EP | 0 281 402 | | 9/1988 |
| EP | 0 945 837 | | 9/1999 |
| EP | 0 945 837 | A2 * | 9/1999 |
| GB | 2105891 | | 3/1983 |
| GB | 2 222 712 | | 3/1990 |
| GB | 2 262 642 | A | 6/1993 |
| GB | 2 387 010 | A | 10/2003 |
| GB | 2 393 022 | A | 3/2004 |
| GB | 2 393 311 | A | 3/2004 |
| GB | 2 401 705 | A | 11/2004 |
| WO | WO 82/01611 | | 5/1982 |
| WO | WO 97/27569 | | 7/1997 |
| WO | 98/00207 | | 1/1998 |

OTHER PUBLICATIONS www.wheeloffortuneinfo.com, of Aug. 12, 2004, Wheel of Fortune game show, downloaded from web.archive.org/web/20040812155927/http://www.wheeloffortuneinfo.com/index.html on Aug. 19, 2007.*

Scarne's Encyclopedia of Card Games, by John Scarne, 1973, HarperCollins, chapters on poker and blackjack.*

"Dice Game," of Feb. 15, 2002, downloaded from http://web.archive.org/web/20020215134809/gscentral.net/dice.htm, Mar. 13, 2008.*

Nevada Gaming Regulation 14.025, downloaded from http://www.gaming.nv.gov/stats_regs/all_regs.pdf, on Apr. 30, 2009.*

"Scarne's Complete Guide to Gambling," by John Scarne, 1961, Simon & Schuster, New York, N. Y., chapter on craps.*

IDU Dice Mechanism written by Starpoint Electrics Ltd., published in Jul. 2000.

IDU Dice Unit Advertisement written by starpoint.uk.com, printed on May 14, 2001.

4DU Dice Unit Advertisement written by starpoint.uk.com, printed on Sep. 3, 2002.

Bally Slot Machines Electro-Mechanicals 1964-1980, Revised 3rd Edition written by Marshall Fey.

Beer Game: High-low description, printed from reelbeer.com (website) on May 3, 2001.

Dice Games article describing Poker Dice, published prior to 2001.

Double Dice Advertisement written by JHV Gaming Products, undated and English explanation from errel.com, printed on Jan. 24, 2003.

Double Up Poker Game Description written by IGT, available prior to 2000.

Free! 7-Day Trial on Daval's Reel Dice Advertisement written by Gerber & Glass, published in 1936.

Game Devices Advertisement written by starpoint.uk.com, printed on Sep. 3, 2002.

High-low card game description, printed from math.hws.edu (website) on Aug. 2, 2004.

High-low card game description, printed from www.geocities.com (website) on Aug. 2, 2004.

How to Play—Roll & Win Instructions written by WMS Gaming, wmsgaming.com, printed on Aug. 29, 2001.

I Love Lucy Advertisement written by IGT, published in 2002.

In Between Game Description IGT, available prior to 2000.

Levy Patent Abstract written by Derwent Publications Ltd., published in 1991.

Mikohn Solutions, World Gaming Congress 2000 Edition.

Money Grab Advertisement written by WMS Gaming, Inc., wmsgaming.com, printed on Jan. 30, 2003.

Money Grab Article written by Strictly Slots, published in Apr. 2001.

Monopoly Brochures and Articles, written by WMS Gaming, Inc., published 1998.

Monopoly Party Train Article written by Strictly Slots, published Feb. 2002.
New Kids Article written by Strictly Slots, published in Dec. 2000.
Price is Right Dice Game Article, printed from gscentral.net/dice.htm website on Jul. 30, 2004.
Price is Right Hi-Lo Article, printed from gscentral.net/hilo.htm website on Jul. 30, 2004.
Roll & Win Advertisement written by WMS Gaming, wmsgaming.com, printed Jun. 8, 2001.
Roulette Description, Gaming Guide Peppermill Hotel, available prior to 2000.
Run for Your Money Brochure, IGT, 1998.
Slot Machine Buyer's Handbook A Consumer's Guide to Slot Machines written by David L. Saul and Daniel R. Mead, published 1998.
Slot Machines A Pictorial History of the First 100 years, $5^{th}$ Edition, written by Marshall Fey.
Slot Machines on Parade written by Robert N. Geddes and illustrated by Daniel R. Mead, published 1980.
Spam Article written by IGT, published in 2002.
Starpoint IDU Dice Unit Product Summary written by Starpoint Electrics Ltd., published in Dec. 1999.
Starpoint 4DU Game Device Product Summary written by Starpoint Electrics Ltd.
Description of Stars, Bars and Bones Game, P&M Coin, Inc. available 1997.
Take Your Pick Article, Strictly Slots, published Mar. 2001.
Yahtzee Bonus Advertisement, written by Mikohn Winning Solutions Worldwide, published 1999.
Yahtzee Video Game Advertisement, written by Mikohn Winning Solutions Worldwide, published 1999.

* cited by examiner

GAMING DEVICE HAVING A HIGH-LOW GAME

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

Many existing gaming machines, such as, traditional slot machines, include bonus schemes. Typically, a bonus round of the bonus scheme begins when the player reaches a bonus triggering event in the primary game of the gaming device. In slot machines that employ reels, the triggering event generally occurs when the player reaches a predetermined combination of symbols on the reels. In general, the bonus round provides the player with an opportunity to gain and accumulate a bonus value or award before the bonus round ends or terminates.

For example, in "In-Between" bonus games, two cards from a standard deck of cards are dealt face up. The player can wager on whether the next card dealt from the deck of cards is between the two dealt cards. The player wins if the next card is in between the two cards and loses if it is not.

In another known bonus game, one card from a standard deck of cards is displayed face up and four cards are displayed face down. The player must choose a single face down card which the player guesses to be higher than the face up card. A correct choice doubles the player's previous win and provides the player another chance to double the player's win or collect the player's winnings. In one version, an incorrect choice ends the double up game and the player's prior winnings are lost. In another version, a choice lower than the face up card results in a loss of all of the player's prior winnings and a choice equal to the face up card results in a replay of the double up game.

In another bonus game, the player selects or is dealt a card. If the card is low (e.g., 2 to 7) the player loses the player's prior winnings. If the card is high (e.g., 9 to Ace) the player's prior winnings are doubled. If the card is an intermediate card (e.g., 8) the player loses or the double up game is repeated.

In another game described in U.S. Pat. No. 6,602,135, a player is enabled to predict whether a symbol is included in one of a plurality of symbol sets. In this game, a plurality of symbol sets are formed from a plurality of symbols. A player is enabled to predict which symbol set will include a randomly determined symbol. If the player is wrong, the game ends. If the player predicts correctly, the player receives an award and the game continues with the symbol sets changing after each correct prediction. If the player correctly predicts a predetermined number of times without being incorrect, the player wins a relatively larger award.

To increase player enjoyment and excitement, it is desirable to provide players with gaming devices having new bonus schemes.

SUMMARY OF THE INVENTION

The present invention relates in general to a gaming device, and more particularly to a gaming device having a high-low game. In one embodiment of the present invention, the game generates a target number or symbol and a player is provided an award based on a number or plurality of predictions regarding the components of the target number or symbol.

In one embodiment, upon the initiation of the high-low game, the gaming device determines a target number or symbol. The determined target number or symbol is masked or otherwise not displayed to the player. In one embodiment, the target number corresponds to the price of a particular product, such as a car. This may help the player with the player's predictions. The target number or symbol is formed from a plurality of component numbers or symbols. Each component number or symbol is from a predetermined range of numbers or symbol, such as the numbers one to ten or the letters A to Z. In an alternative embodiment, rather than determining a target number, the gaming device generates a plurality of component numbers.

In one embodiment, as the game is played, the gaming device generates and displays a first prediction number that relates to a first component number of the target number. The generated first prediction number is from the same predetermined range of numbers as the range of component numbers. If the generated first prediction number matches (i.e., is the same number as) the first component number of the target number, the first component number of the target number is revealed to the player and an award based on the revealed number (i.e., the revealed number modified by at least one modifier) is accumulated in an award meter or provided to the player. If the generated first prediction number does not match the first component number of the target number, the player is enabled to input a prediction regarding what is the correct related component number from a set or group of possible component numbers wherein the set or group is based on the prediction number. That is, as each prediction number and each component number are from the same range of numbers, each prediction number (i.e., the first prediction number) forms or splits the range of numbers into at least two groups or number sets wherein the component number will be included in one of the groups or sets (i.e., the numbers in the range that are higher than the first prediction number and the numbers in the range that are lower than the first prediction number). For example, after two groups or number sets are formed based on a first prediction number, the gaming device displays each number from the group or number set that includes the first component number. The gaming device enables the player to input a prediction regarding the first component number by selecting one of the displayed numbers which the player thinks is the first component number of the target number.

After the player's selection, the first component number of the target number is revealed to the player. If the player selected number is the first component number of the target number, an award is accumulated in the award meter or provided to the player wherein the award is based on the selected first component number. For example, the first component number is modified by a modifier or multiplier. It should be appreciated that the award amount ultimately provided to the player is based on the number of correctly revealed component numbers (i.e., the number of times that a prediction number matches a component number or the player correctly inputs a prediction regarding a component number) because the award or modifier used to determine the award increases for each correctly revealed component number. That is, the award determined for each correctly revealed component will be greater than the award determined for at least one and preferably each of the previously determined awards.

The gaming device proceeds to the next unrevealed component number of the target number and each subsequent unrevealed component number as described above (i.e., generating another prediction number and, if the generated prediction number does not match the next unrevealed component number of the target number, enabling the player to input a prediction regarding the next component number of the target number) until each component number of the target number is revealed (i.e., the target number is displayed). In this embodiment, the modifier used to determine the award for each correctly revealed component number is increased for each correctly revealed component number. That is, if a first component number is correctly revealed, then the modifier used to modify an award associated with a second correctly revealed component number will be greater than the modifier used to modify the award associated with the first correctly revealed component number. Once the target number is displayed, the gaming device provides the player the awards, if any, accumulated in the award meter or otherwise not provided to the player and the high-low game ends.

In one embodiment, the target number is a multi-digit number and each digit of the multi-digit number is a component number. In this embodiment, the gaming device generates and displays a single-digit number, for example by enabling a player to cause the shaking of a virtual die and the single-digit number generated is the first prediction number. In this embodiment, the range of numbers will be the possible numbers generated from the die or one to six. If the first prediction number matches the first component or first digit of the target number, the award meter accumulates an award which is based on the first component or first digit of the target number (i.e., the first component number modified by a first modifier). If the first prediction number does not match the first component or first digit of the target number, the gaming device forms two groups or number sets based on the first prediction number. For example, if the first prediction number generated by the shaken die is four, then the gaming device forms a set of range numbers that are higher than the prediction number (i.e., five and six) and a set of range numbers that are lower than the prediction number (i.e., one, two and three). The gaming device indicates to the player which set includes the first component number or first digit of the target number and displays each number from the indicated set. The gaming device enables the player to input a selection of one of the displayed numbers. If the player selected the correct number, the gaming device reveals the first component number or first digit of the target number and the award meter accumulates an award which is based on the displayed first component number or first digit of the target number (i.e., the first component number modified by a first modifier). In another embodiment, the award meter accumulated an award which is based on the first prediction number (i.e., the number generated by the virtual die). If the player did not select the correct number, the gaming device reveals the first component number or first digit of the target number and proceeds to the next masked or unrevealed component number.

As the game proceeds, the gaming device enables the player to cause the shaking of the virtual die to generate another single-digit number that is displayed to the player as a second prediction number. If the second prediction number matches the second component number (i.e., the second digit of the target number), the gaming device reveals the second component or second digit of the target number and the award meter accumulates an award that is based on the revealed second component number (i.e., the second component number modified by a second modifier). In this embodiment, each subsequent modifier is greater than the previous modifier (i.e., the second modifier is greater than the first modifier) and thus the award for each subsequent match or correct prediction of a component number is increased.

If the second prediction number does not match the second component or digit of the target number, the gaming device forms two groups or sets of numbers or components based on the second prediction number and indicates to the player which set includes the second component or digit of the target number, enables the player to input a selection of one of the numbers from the indicated set and reveals the second component or second digit of the target number as described above. The award meter accumulates an award, if any, based on the player's selection (i.e., the second component number modified by a second modifier). The gaming device proceeds to the next and each subsequent unrevealed digit of the target number, if any, until each component or digit of the target number is revealed. Once the target number is revealed, the gaming device provides the player the accumulated awards indicated in the award meter and the high-low game ends. In this embodiment, the award provided to the player is based on a plurality of number prediction sequences.

Thus, in one embodiment, the gaming device provides a series of number games wherein the award provided to the player is based on the correct answers or numbers from at least one and preferably each of the number games. In one embodiment, each correct answer to one of the number games is modified by a different modifier, wherein the modifier changes with each correct answer. That is, the more correct answers the player predicts in the provided number games, the greater the modifier will be for each subsequent correct answer. Moreover, the gaming device provides a series of high-low number games wherein rather than enabling a player to predict which number set includes a selected number, the gaming device indicates the number set that includes the selected number and enables the player to predict the selected number, for example, in response to a prompting or question.

In another embodiment, rather than providing a series of high-low number games, the gaming device provides one high-low prediction sequence. In this embodiment, the gaming device displays an initial symbol or number and selects a subsequent symbol or number. The gaming device forms a symbol or number set that includes the subsequently selected symbol or number. The gaming device displays each symbol or number from the formed set and enables the player to input a pick or prediction of one of the displayed symbols or numbers. For example, the game displays that the subsequently selected number is greater than the initially displayed number and asks the player to pick one of the numbers which is greater than the initially displayed number. If the player picked the subsequently selected symbol or number, the player is provided an award or other suitable outcome. If the player did not pick the gaming device selected symbol or number, the player is not provided an award or other suitable come and the game ends.

In another embodiment, rather than displaying to the player the group or number set which includes one of the component numbers, the gaming device enables the player to input a selection of which group or number set includes the component number. In this embodiment, the award provided to the player is based on a combination of the accumulated prediction numbers, the number of times a prediction number matches a component number and the number of times the player inputs a correct prediction.

In this embodiment, a prediction number is generated for each component of the target number as described above. For each generated prediction number, a prediction number meter or modifier is increased based on the generated prediction number. In this embodiment, if a prediction number matches a related component number of the target number, then a meter or modifier tracking the number of times a prediction number matches a related component number is increased. If a prediction number does not match a related component number, then at least two groups or sets of numbers are formed based on prediction number as described above. In this embodiment, the player is enabled to input a prediction of which formed set includes the related component number. For example, the player is enabled to input a prediction of whether a first component number is included in a group or set of numbers higher than a first prediction number or if the first component number is included in a group or set of numbers lower than the first prediction number. That is, the gaming device enables the player to input a prediction of whether the first component number is higher or lower than the first prediction number. If the player's prediction is correct, the gaming device reveals the first component number of the target number and a meter or modifier tracking the number of times the player inputs a correct prediction is increased. If the player's prediction is not correct, the gaming device reveals the first component number and proceeds with the above described sequence for the next unrevealed component number and each subsequent unrevealed component number, if any, until all the component numbers are revealed. When all the component numbers are revealed, the gaming device provides the player an award based on the meter or modifier tracking each generated prediction number, the meter or modifier tracking the number of correct predictions and the meter or modifier tracking the number of times a generated prediction number matches a component number and the high-low game ends.

The present invention provides a gaming device wherein the award ultimately provided to the player is based on multiple elements that are accumulated during the player of the high-low game. That is, the present invention provides a player with multiple chances to increase their award, such as with each correct player prediction.

Additional features and advantages of the present invention are described in, and will be apparent from, the following Detailed Description of the Invention and the figures.

DETAILED DESCRIPTION OF THE INVENTION

Figure 1A:
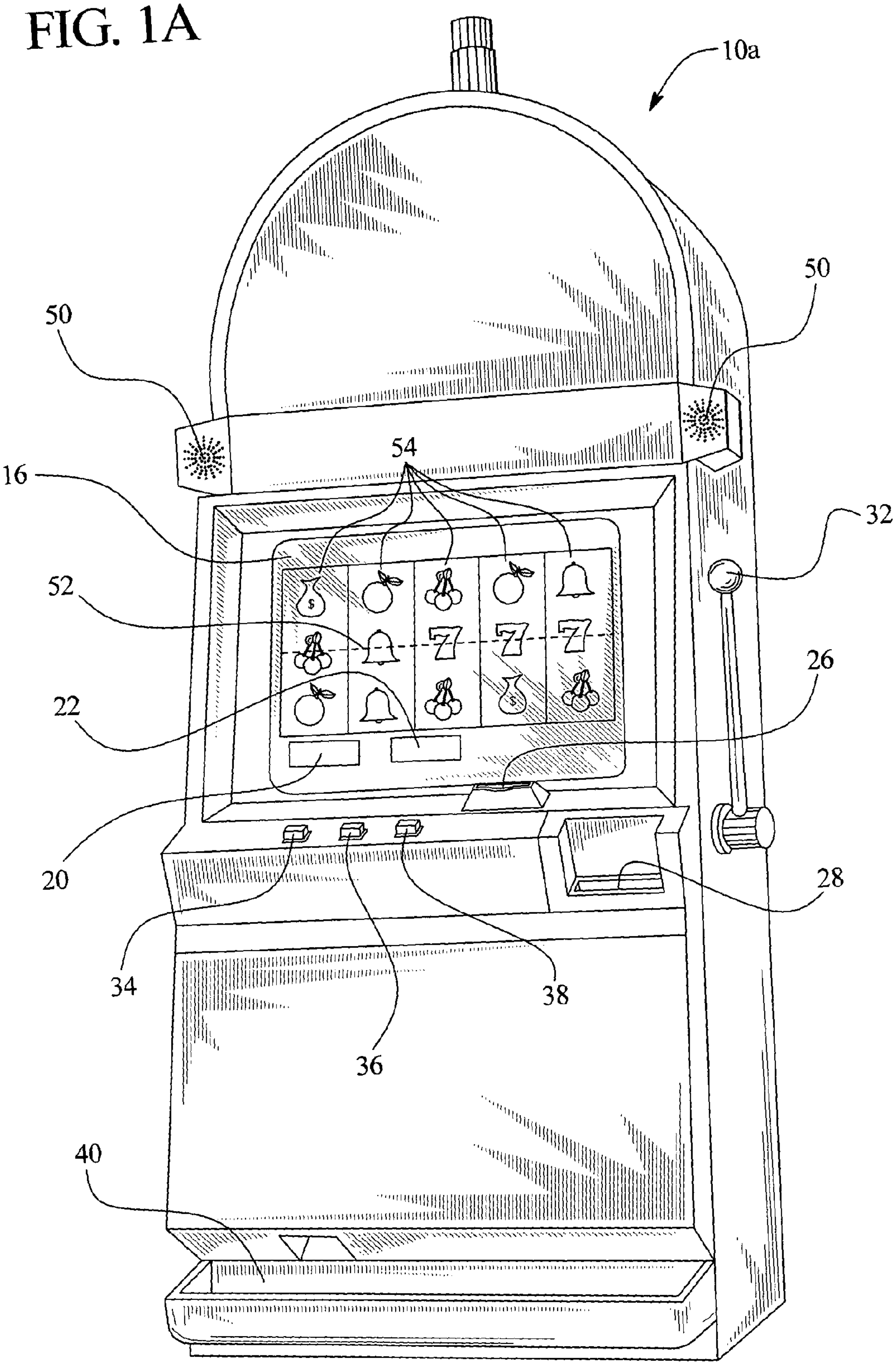
FIG. 1A is a front-side perspective view of one embodiment of the gaming device of the present invention.
Figure 1B:
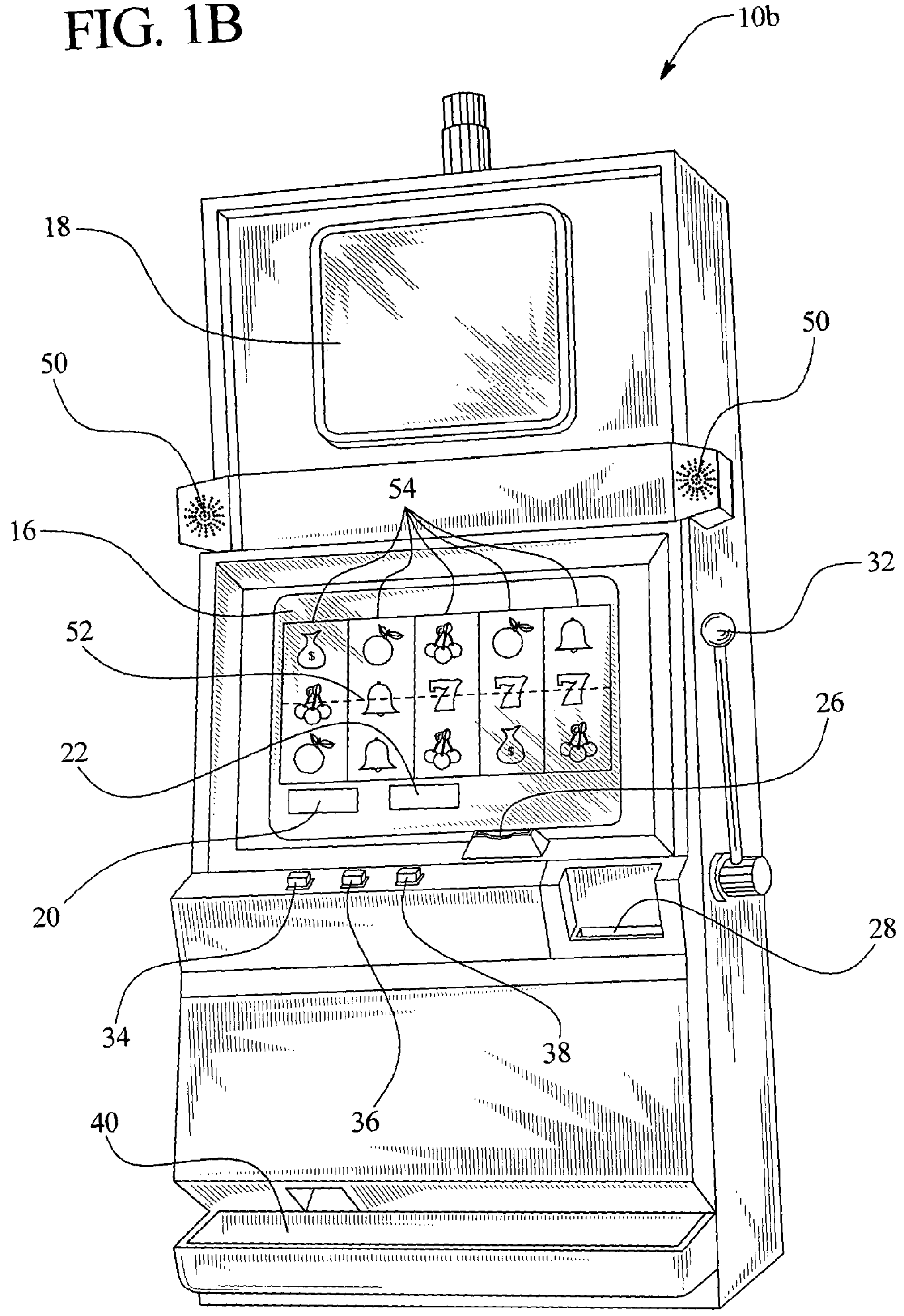
FIG. 1B is a front-side perspective view of another embodiment of the gaming device of the present invention.

Referring now to the drawings, two alternative embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device can be constructed with varying cabinet and display configurations.

Figure 2A:
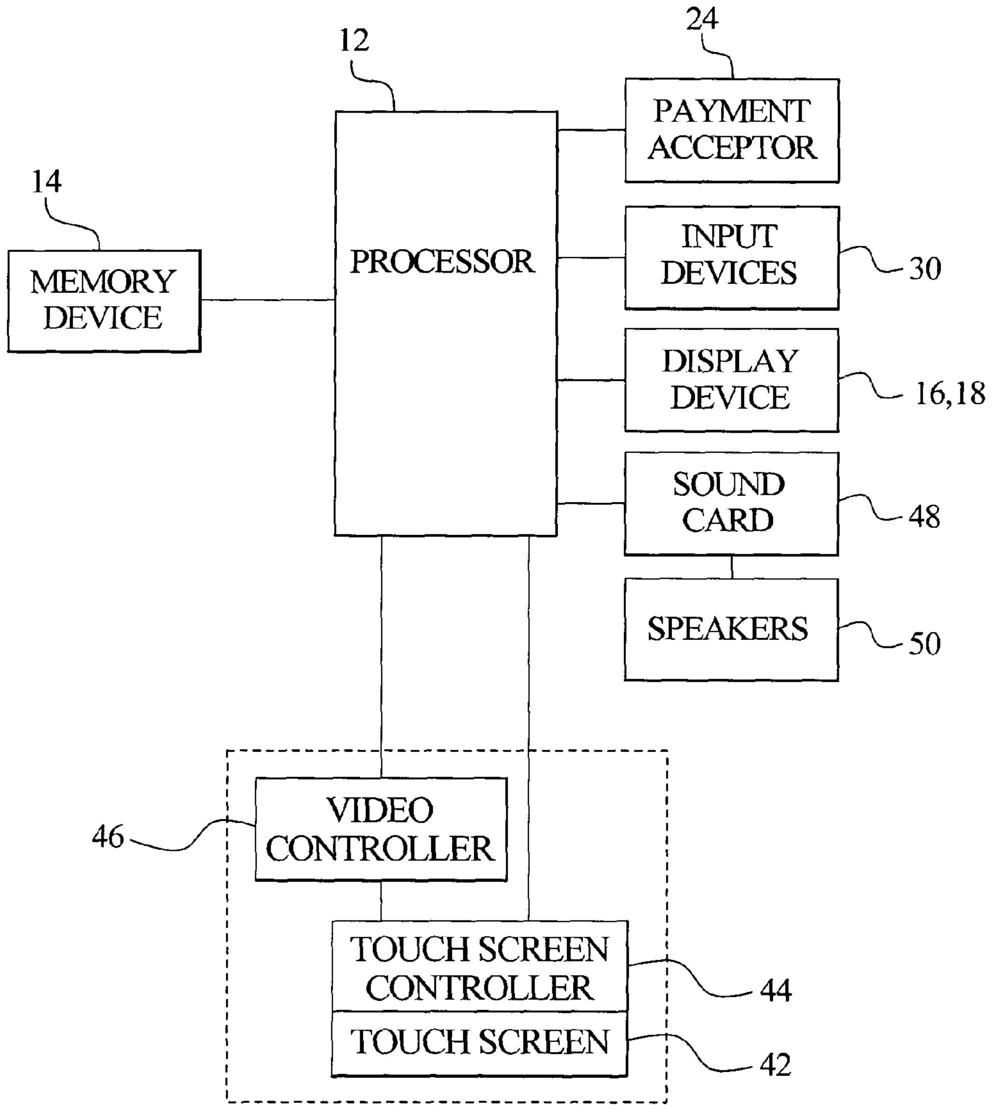
FIG. 2A is a schematic block diagram of the electronic configuration of one embodiment of the gaming device of the present invention.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or other operating data, information and applicable game rules that relate to the play of the gaming device. In another embodiment, the memory device includes random access memory (RAM). In one embodiment, the memory device includes read only memory (ROM). In a further embodiment, the memory device includes flash memory and/or EEPROM (electrically erasable programmable read only memory). Any other suitable magnetic, optical and/or semiconductor memory may be implemented in conjunction with the gaming device of the present invention.

In one embodiment, part or all of the program code and/or operating data described above can be stored in a detachable or removable memory device, including, but not limited to, a suitable cartridge, disk or CD ROM. A player can use such a removable memory device in a desktop, a laptop personal computer, a personal digital assistant (PDA) or other computerized platform. The processor and memory device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. In this type of embodiment, the gaming device provides players with all of the available awards or other game outcomes over the course of the play cycle and guarantees a designated amount of actual wins and losses.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated with the primary game and/or information relating to the primary or secondary game. As seen in FIGS. 1A and 1B, in one embodiment, the gaming device includes a credit display 20 which displays a player's current number of credits, cash, account balance or the equivalent. In one embodiment, the gaming device includes a bet display 22 which displays a player's amount wagered.

The display devices may include, without limitation, a monitor, a television display, a plasma display, a liquid crystal display (LCD), a display based on light emitting diodes (LED) or any other suitable electronic device or display mechanism. In one embodiment, as described in more detail below, the display device includes a touch-screen with an associated touch-screen controller. The display devices may be of any suitable configuration, such as a square, a rectangle or an elongated rectangle.

The display devices of the gaming device are configured to display at least one and preferably a plurality of games or other suitable images, symbols and indicia such as any visual representation or exhibition of the movement of objects such as mechanical, virtual or video reels and wheels, dynamic lighting, video images and images of people, characters, places, things and faces of cards, tournament advertisements, promotions and the like.

In one alternative embodiment, the symbols, images and indicia displayed on or by the display device may be in mechanical form. That is, the display device may include any suitable electromechanical device which preferable moves one or more mechanical objects, such as one or more mechanical rotatable wheels, reels or dice, configured to display at least one and preferably a plurality of games or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards, data cards or credit slips could be used for accepting payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and the corresponding amount is shown on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game associated with the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips which are redeemable by a cashier or funded to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device.

The videos may also be customized for or to provide any appropriate information.

In one embodiment, the gaming machine may include a player or other sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display device may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

The gaming device can incorporate any suitable wagering primary or base game. The gaming machine or device of the present invention may include some or all of the features of conventional gaming machines or devices. The primary or base game may comprise any suitable reel-type game, card game, number game or other game of chance susceptible to representation in an electronic or electromechanical form which produces a random outcome based on probability data upon activation of the game from a wager made by the player. That is, different primary wagering games, such as video poker games, video blackjack games, video keno, video bingo or any other suitable primary or base game may be implemented into the present invention.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device displays at least one reel and preferably a plurality of reels 54, such as three to five reels, in either electromechanical form with mechanical rotating reels or in video form with simulated reels and movement thereof. In one embodiment, an electromechanical slot machine includes a plurality of adjacent, rotatable wheels which may be combined and operably coupled with an electronic display of any suitable type. In another embodiment, if the reels are in video form, the plurality of simulated video reels are displayed on one or more of the display devices as described above. Each reel displays a plurality of indicia such as bells, hearts, fruits, numbers, letters, bars or other images which preferably correspond to a theme associated with the gaming device. In this embodiment, the gaming device awards prizes when the reels of the primary game stop spinning if specified types and/or configurations of indicia or symbols occur on an active pay line or otherwise occur in a winning combination or pattern.

In one embodiment, a base or primary game may be a poker game wherein the gaming device enables the player to play a conventional game of video poker and initially deals five cards, all face up, from a virtual deck of fifty-two cards. Cards may be dealt as in a traditional game of cards or in the case of the gaming device, the cards may be randomly selected from a predetermined number of cards. If the player wishes to draw, the player selects the cards to hold by using one or more input devices, such as pressing related hold buttons or touching a corresponding area on a touch-screen. After the player presses the deal button, the processor of the gaming device removes the unwanted or discarded cards from the display and deals replacement cards from the remaining cards in the deck. This results in a final five-card hand. The processor of the gaming device compares the final five-card hand to a payout table which utilizes conventional poker hand rankings to determine the winning hands. Award based on a winning hand and the credits wagered is provided to the player.

In another embodiment, the base or primary game may be a multi-hand version of video poker. In this embodiment, the player is dealt at least two hands of cards. In one such embodiment, the cards in all of the dealt hands are the same cards. In one embodiment each hand of cards is associated with its own deck of cards. The player chooses the cards to hold in a primary hand. The held cards in the primary hand are also held in the other hands of cards. The remaining non-held cards are removed from each displayed hand and replaced with randomly dealt cards. Since the replacement cards are randomly dealt independently for each hand, the replacement cards will usually be different for each hand. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one and preferably a plurality of the selectable indicia or numbers by using an input device or by using the touch-screen. The gaming device then displays a series of drawn numbers to determine an amount of matches, if any, between the player's selected numbers and the gaming device's drawn numbers. The player is provided an award, if any, based on the amount of determined matches.

In one embodiment, in addition to winning credits in a base or primary game, the gaming device may also give players the opportunity to win credits in a bonus or secondary game or bonus or secondary round. The bonus or secondary game enables the player to obtain a bonus prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program code which causes the processor to automatically begin a bonus round when the player has achieved a triggering event, a qualifying condition or other designated game event in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In another embodiment, the triggering event or qualifying condition may be triggered by exceeding a certain amount of game play (number of games, number of credits, amount of time), earning a specified number of points during game play or as a random award.

In one embodiment, once a player has qualified for a bonus game, the player may subsequently enhance their bonus game participation by returning to the base or primary game for continued play. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple bonus qualifying events in the primary game may result in an arithmetic or geometric increase in the number of bonus wagering credits awarded. In one embodiment, extra bonus wagering credits may be redeemed during the bonus game to extend play of the bonus game.

In one embodiment, no separate entry fee or buy in for a bonus game need be employed. That is, a player may not purchase an entry into a bonus game. The player must win or earn entry through play of the primary game, thereby encouraging play of the primary game. In another embodiment, qualification of the bonus or secondary game could be accomplished through a simple "buy in" by the player if, for example, the player has been unsuccessful at qualifying for the bonus game through other specified activities.

Figure 2B:
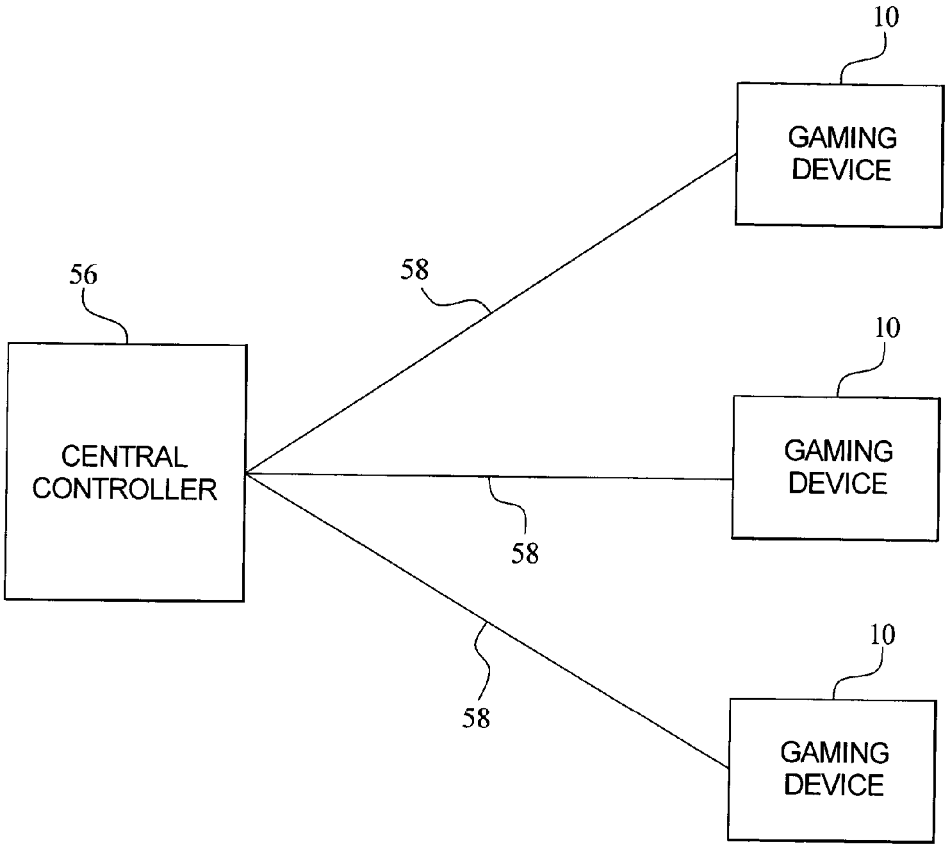
FIG. 2B is a schematic block diagram illustrating a plurality of gaming terminals in communication with a central controller.

In one embodiment, as illustrated in FIG. 2B, one or more of the gaming devices 10 of the present invention may be connected to a data network or a remote communication link 58 with some or all of the functions of each gaming device provided at a central location such as a central server or central controller 56. More specifically, the processor of each gaming device may be designed to facilitate transmission of signals between the individual gaming device and the central server or controller.

In one embodiment, the game outcome provided to the player is determined by a central server or controller and provided to the player at the gaming device of the present invention. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and/or preventing cheating or electronic or other errors, reducing or eliminating win-loss volatility and the like.

In another embodiment, one or more of the gaming devices of the present invention are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or an on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices of the present invention are capable of being connected to a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system of the present invention may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server or webserver) through a conventional phone or other data transmission line, digital signal line (DSL), T-1 line, coaxial cable, fiber optic cable, wireless gateway or other suitable connection. In this embodiment, players may access an internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer.

High-Low Game

In one embodiment of the present invention, upon the initiation of the high-low game, the gaming device generates a target number or symbol. In one embodiment, the target number or symbol is randomly generated. In another embodiment, the target number or symbol is predetermined. The determined target number or symbol is masked or otherwise not displayed to the player. In one embodiment, the target number corresponds to the price of a particular product, such as a car. The target number or symbol is formed from a plurality of component numbers or symbols. Each component number or symbol is from a range of numbers or symbols, such as the numbers one to ten or the letters A to Z. The range of numbers or symbols may be predetermined or randomly determined upon the initiation of the high-low game. While numbers are used herein to describe the high-low game, any other suitable images, symbols or indicia, such as letters, days of the weeks, months of the year, may be implemented with the present invention. It should be appreciated that while a target number or symbol is used to describe the high-low game, in one embodiment the present invention does not include a target number or symbol but rather includes a plurality of generated component numbers or symbols.

Figure 3A:
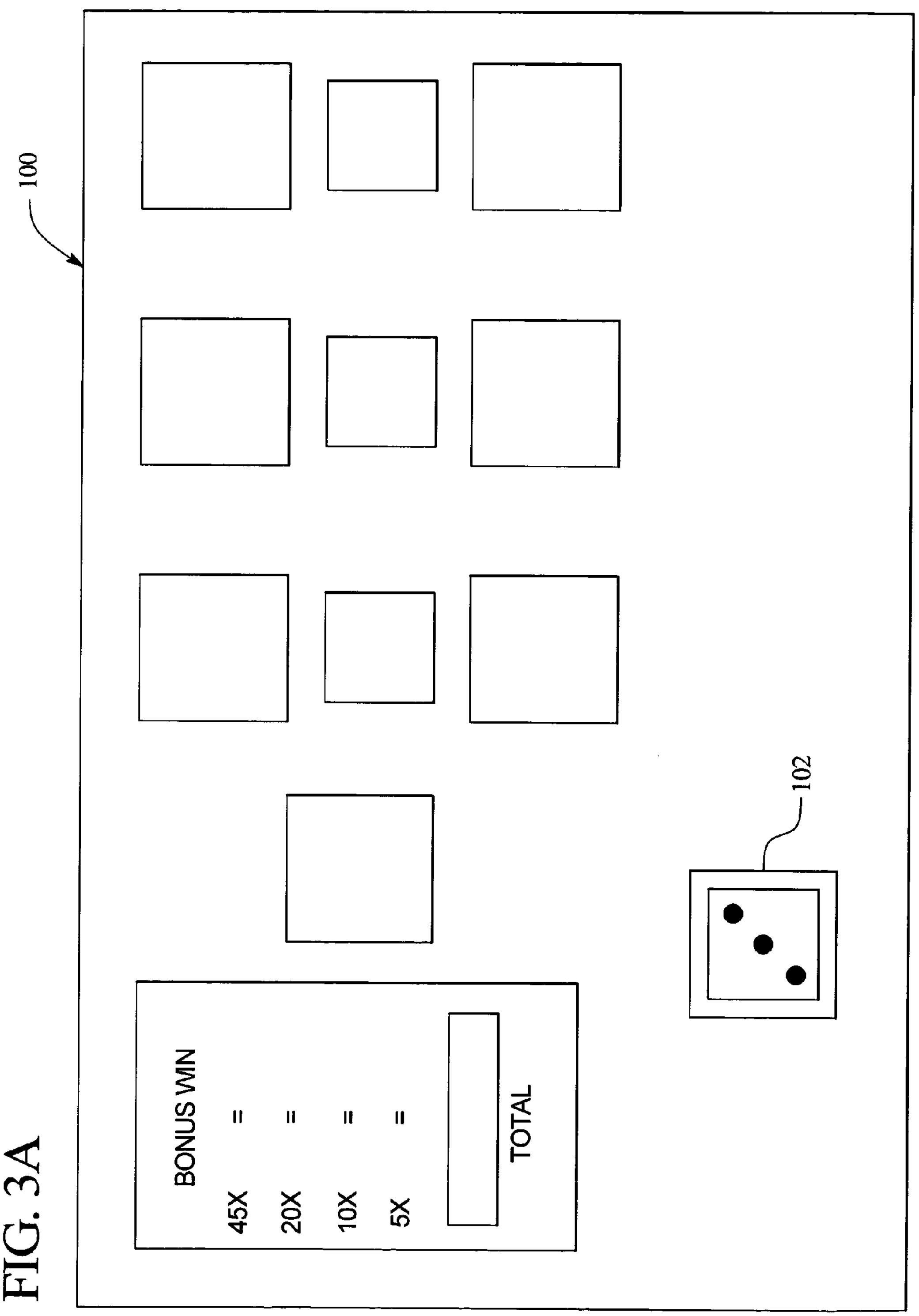
FIGS. 3A, 3B, 3C, 3D, 3E, 3F and 3G are front elevational views of one embodiment of the present invention illustrating a player predicting a plurality of component numbers of a target number.

Referring now to FIG. 3A, one embodiment of the high-low game of the present invention provides a screen or display 100 which enables a player to make selections in order to obtain an award. In this embodiment, the target number is a four-digit number and each digit of the four-digit number is a component number. It should be appreciated that the target number may be a single digit number or a multi-digit number with any suitable number of digits.

Figure 3B:
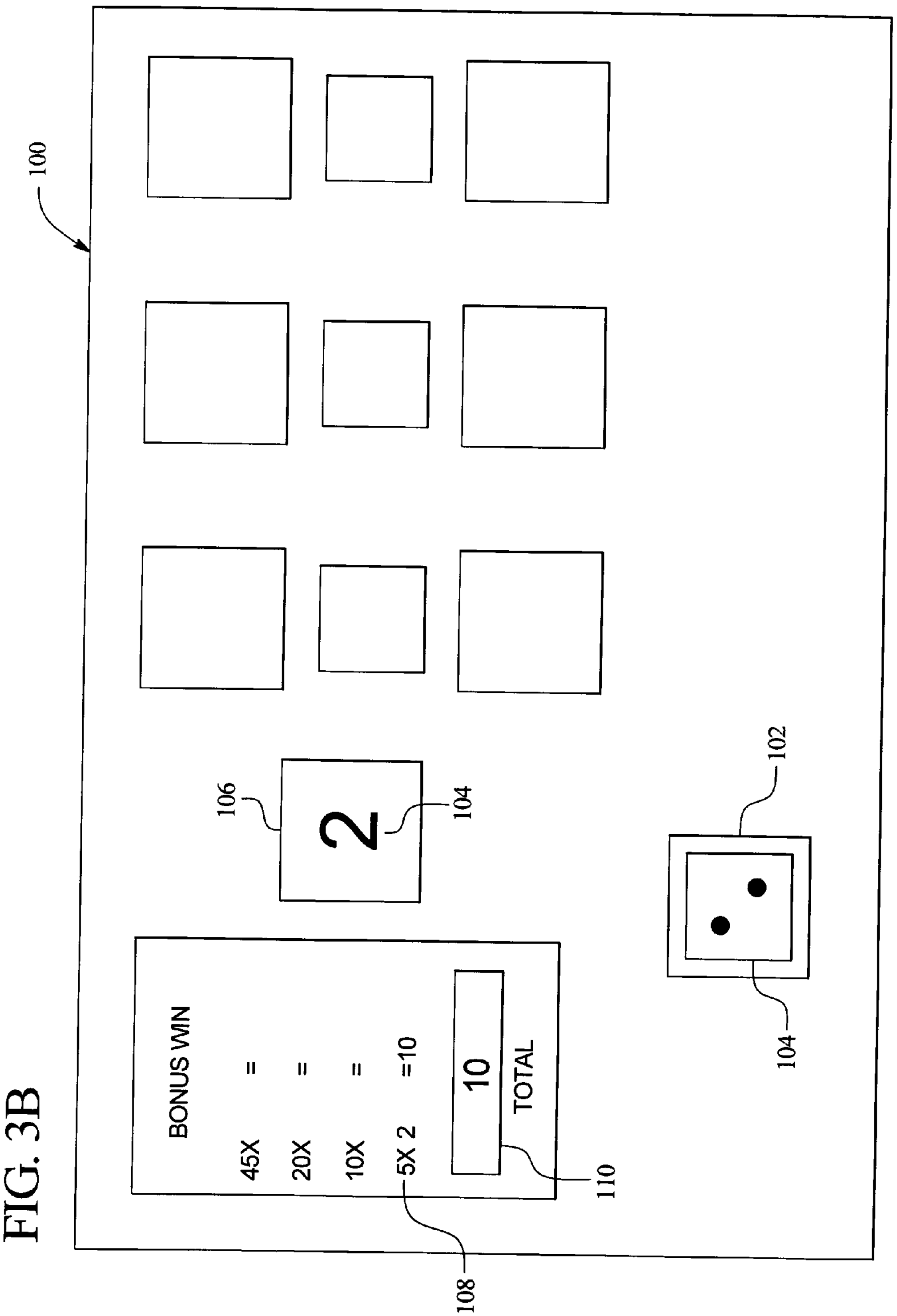

The gaming device selects a first component number to reveal. In one embodiment, the first component number is the first digit of the target number. In another embodiment, the first component number may be any other digit of the target number. After selecting a component number, the gaming device generates a first prediction number which relates to the selected component number. In one embodiment, the gaming device enables the player to generate the first prediction number by spinning a wheel, selecting a masked selection that is associated with a prediction number or any other suitable mechanism to generate a prediction number. As illustrated in FIG. 3B, the gaming device enables a player to cause the shaking of a virtual die 102 to generate the first prediction number 104 of two which is displayed to the player. It should be appreciated that each generated prediction number will be within the same range of numbers as each component number. That is, in this embodiment, since each prediction number will be within the range of one to six (the possible numbers on the die), each component number of the target number must also be within the range of one to six.

The gaming device compares the generated prediction number with the selected component number to determine if the two numbers match. In this embodiment, the generated first prediction number 104 matches (i.e., is the same number as) the first component number 106 of the target number. The generated first prediction number 104 is displayed to the player as the first component number 106 or first digit of the target number and an award is determined based on this match. In this embodiment, the first component number 106 of two is modified by a first modifier 108 of five and the award of ten is provided to the player. The award meter 110 displays the accumulation of all the awards provided to the player in the high-low game.

In one embodiment, the award is the revealed first component number. In another embodiment, the award is the revealed first component number modified by at least one modifier. In another embodiment, the award is randomly determined independent of the revealed first component number. In another embodiment, the award is any other suitable award.

In one embodiment, at least one of the generated prediction numbers will match at least one of the component numbers of the target number. That is, in this embodiment, the player will be provided an award based on at least one component number of the target number (in addition to any other awards provided to the player as the game proceeds) and thus the player is guaranteed an award in the game. In another embodiment, at least one of the generated prediction numbers is not guaranteed to match at least one of the component numbers of the target number and thus the player is not guaranteed an award in the high-low game.

Figure 3C:
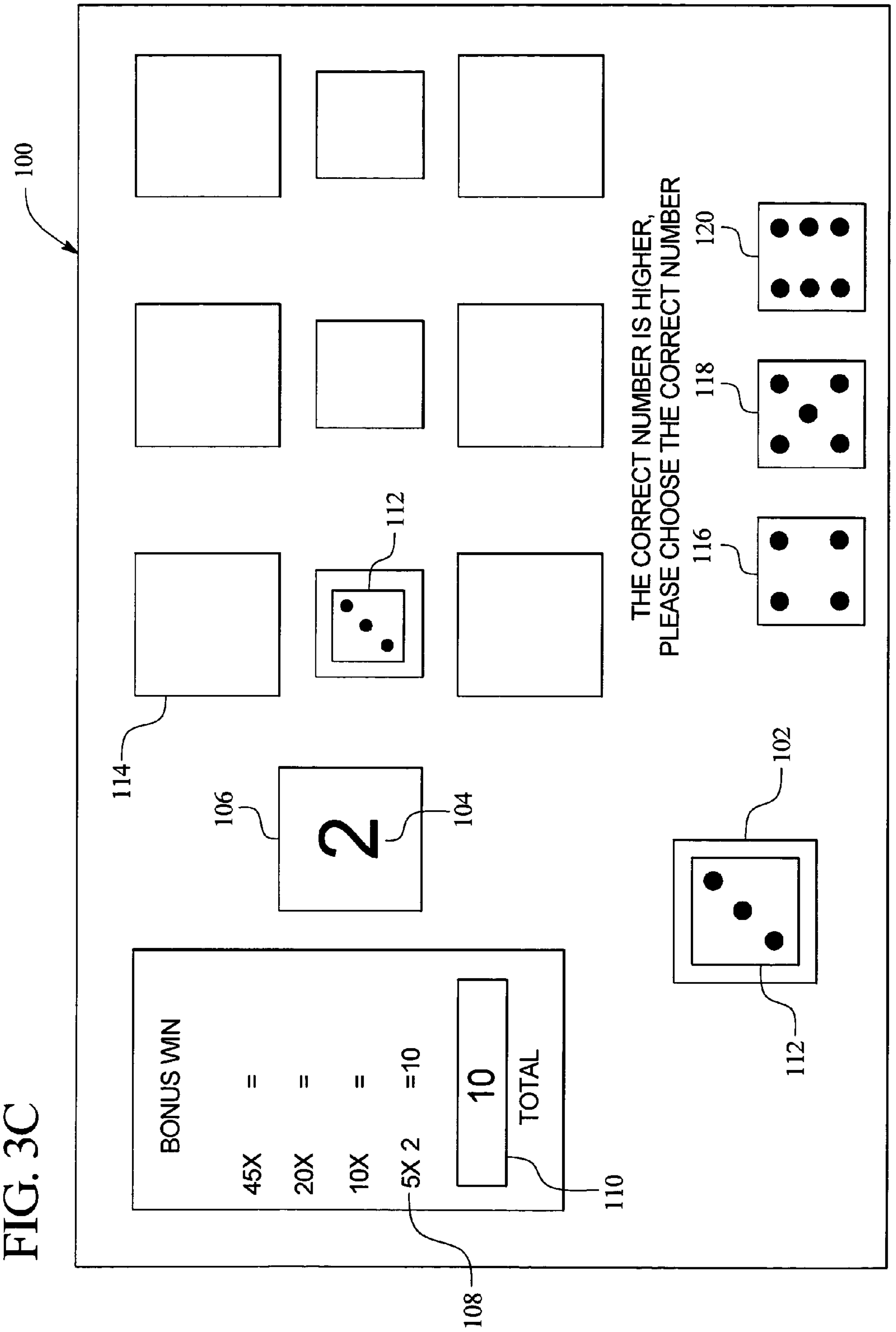

As illustrated in FIG. 3C, after the award based on a modification of the first prediction number is accumulated, the gaming device selects a second component number 114 and generates a second prediction number 112 of three by again causing the shaking of the virtual die 102. The second prediction number is shown positioned in relation to the second digit 114 of the target number. It should be appreciated that while this embodiment illustrates two displays for the digits of the target number (to illustrate that the component number may be higher or lower than the generated prediction number), the present invention can be implemented with one display for the digits of the target number.

As the second prediction number 112 does not match the second component number, two groups or sets of numbers are formed based on the second prediction number. That is, since each prediction number and each component number are from the same range of numbers, the second prediction number is used to split or form the range of numbers into at least two sets of numbers. The gaming device indicates to the player either visually or through suitable audio or audiovisual displays which set includes the second component number. The gaming device then displays each number of the indicated set, represented as numbers 116 to 120 and enables the player to input a prediction of which one of the displayed numbers the player thinks is the second component number of the target number by picking one of the numbers.

In one embodiment, as the target number is associated with the price of a particular product, the player may predict whether the component number is higher or lower than the predicted number based on a belief or knowledge that the player holds regarding the price of the particular product. For example, if the target number is a five digit number associated with the price of an automobile and gaming device informs the player that the first component or first digit of the price of the car is included in a number set which includes the numbers four, five and six, then based on the player's knowledge that the automobile is not valued at or over $60,000, the player can eliminate the number six. By correctly eliminating one of the numbers in the set, the player increases their chances that their selected number will be the correct component number of the target number.

Figure 3D:
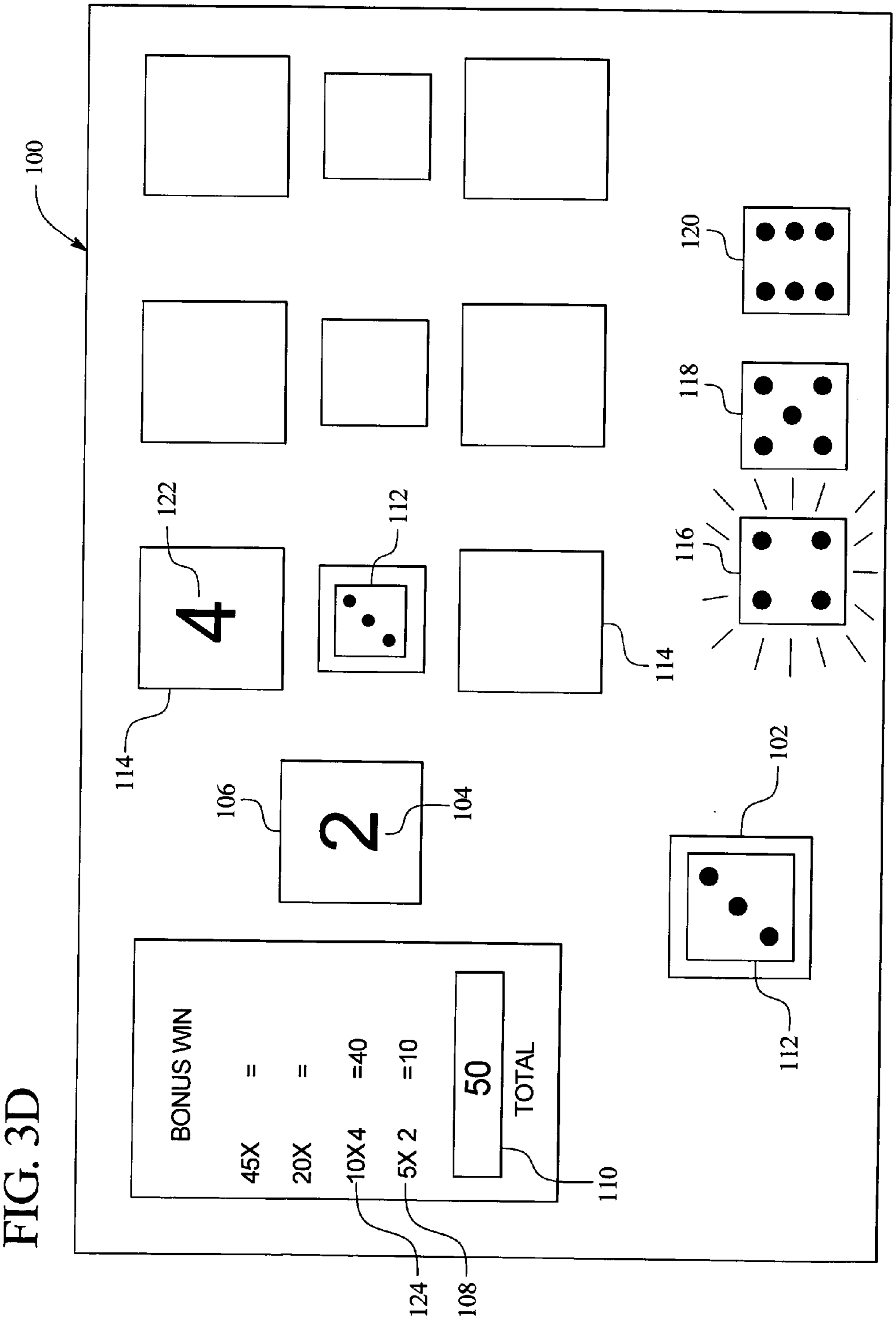

As indicated in FIG. 3D, the player correctly selected the number four 116 as the second component number 122. Accordingly, the second component number 122 of four is revealed to the player as the second digit of the target number. As described above, an award based on the correctly predicted component number is accumulated in the award meter. In this case, the accumulated award is forty which is based on the revealed second component number of four and a second modifier 124 of ten. This award of forty is added to the previously provided award of ten and the award meter 110 illustrates the accumulation of all the awards provided to the player in the high-low game.

In one embodiment, for each accumulated award (i.e., for each time a prediction number matches a component number or the player correctly selects a component number) a greater modifier is used to modify the next or subsequent component number that is matched or correctly predicted. In other words, the more times in the revealing sequence of the present invention that a prediction number matches a component number or the player correctly selects a component number, the greater the modifier used for each sequence and thus the greater the award ultimately provided to the player.

Figure 3E:
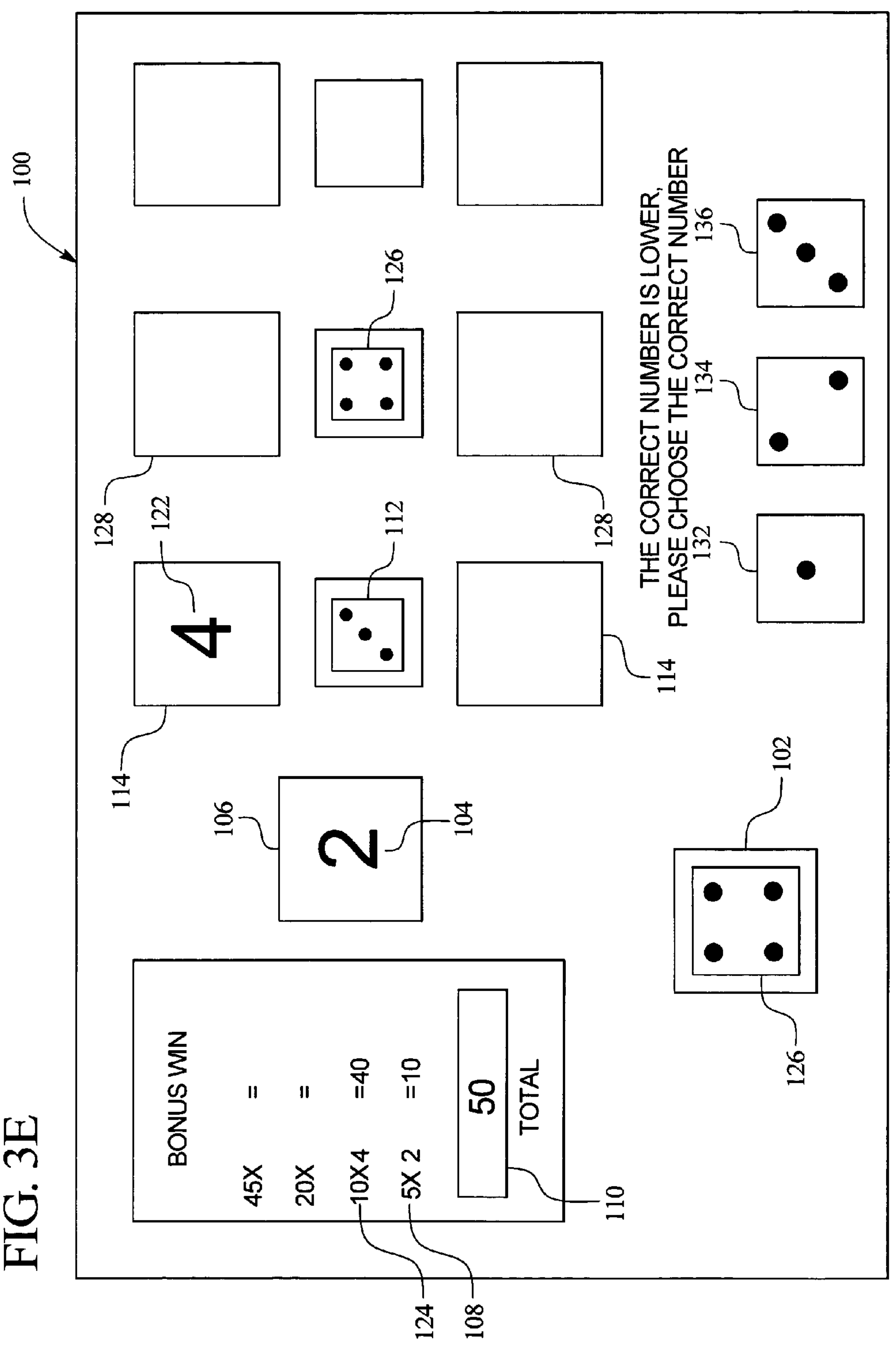

As illustrated in FIG. 3E, since at least one other component number of the target number is masked, the gaming device selects a third component number 128 and generates a third prediction number 126 of four as described above. As the third prediction number 126 does not match the third component number of the target number (i.e., the third digit of the target number), the third prediction number 126 is shown positioned in relation to the third digit 128 of the target number. As described above, two groups or sets of numbers are formed based on the third prediction number and the gaming device indicates to the player which set includes the third component number, for example by indicating that the third component number is lower than the third prediction number. The gaming device displays each number of the indicated set, represented as numbers 132 to 136 and enables the player to input a prediction of the third component number by picking one of the numbers.

Figure 3F:
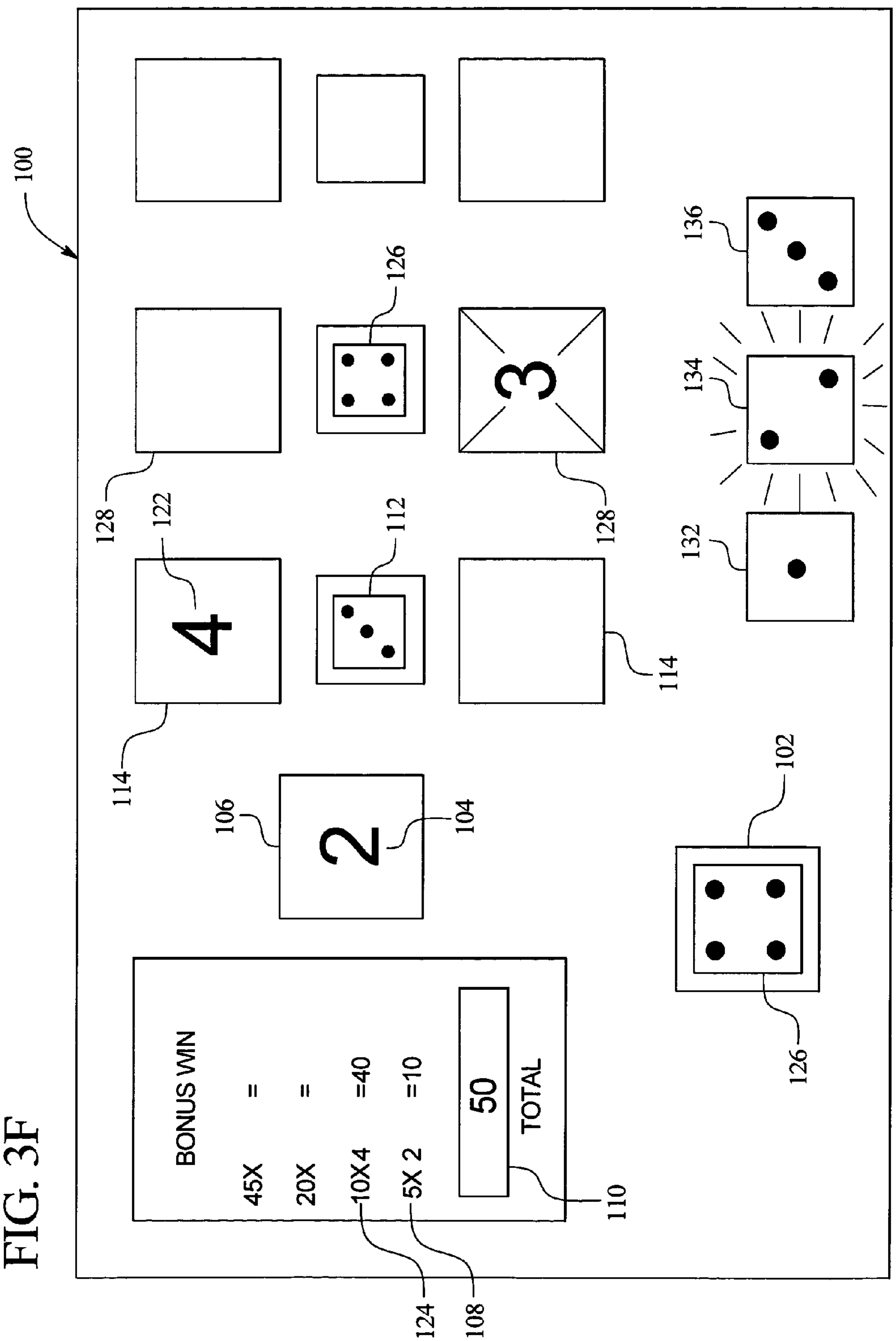

As indicated in FIG. 3F, the player selected the number two 134. However, the correct third component of the target number 138 was the number three. As the player's selected number was not the third component number 138, the player is not provided an award for this prediction. In this embodiment, the correct third component number 138 is revealed to the player with a strikethrough to indicate that the player did not correctly select this component.

Figure 3G:
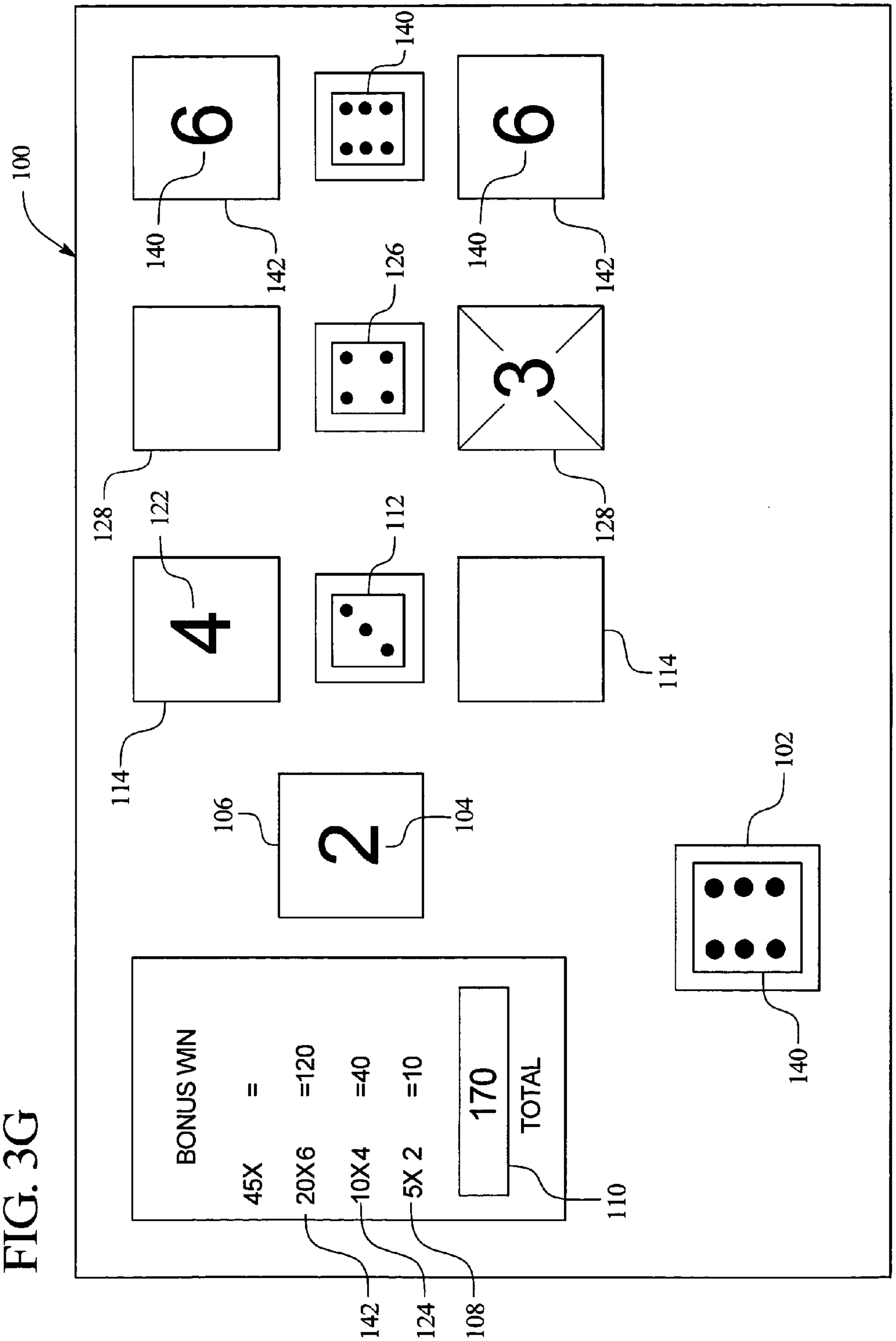

As illustrated in FIG. 3G, since at least one other component number of the target number is masked, the gaming device selects a fourth component number 142 and generates a fourth prediction number 140 of six as described above. For this generation, the fourth prediction number 140 matches the fourth component number 142 (i.e., the fourth digit of the target number) and an award is accumulated in the award meter based on the fourth component number. In this case, the award is one-hundred twenty which is based on the revealed fourth component number 122 of six and a third modifier 124 of twenty. As described above, the third modifier is greater than both the first modifier and the second modifier. This award of one-hundred twenty is added to the previously provided award of fifty and the award meter 110 displays the accumulation of all the awards accumulated in the high-low game. As all the component numbers of the target number are revealed to the player, the gaming device provides the player the awards accumulated in the award meter and the high-low game ends. The award meter 110, indicating the amount 170, is the sum of the first prediction number 104 (amount of 2) times the first modifier 108 (multiplier of 5) (FIG. 3B) plus the selected number 116 (amount of 4) times the secod modifier 124 (multiplier of 10) (FIG. 3D), plus the fourth prediction number 140 (amount of 6) times the third modifier 142 (multiplier of 20) (FIG. 3G), for a total of $170=(5\times2)+(10\times4)+(20\times6)$.

In another embodiment, rather than displaying to the player the number set which includes one of the component numbers, the gaming device enables the player to input a selection of which number set includes the component number. In this embodiment, the award provided to the player is based on a combination of the accumulated prediction numbers, the number of times a prediction number matches a component number and the number of times the player inputs a correct prediction.

In this embodiment, a prediction number is generated for each component of the target number as described above. For each generated prediction number, a prediction number meter or modifier is increased based on the generated prediction number. In this embodiment, if a prediction number matches a related component number of the target number, then a meter or modifier tracking the number of times a prediction number matches a related component number is increased. If a prediction number does not match a related component number, then at least two sets of numbers are formed based on prediction number as described above. In this embodiment, the player is enabled to input a prediction of which formed set includes the related component number. For example, the player is enabled to input a prediction of whether a first component number is included in a set of numbers higher than a first prediction number or if the first component number is included in a set of numbers lower than the first prediction number. That is, the gaming device enables the player to input a prediction of whether the first component number is higher or lower than the first prediction number. If the player's prediction is correct, the gaming device reveals the first component number of the target number and a meter or modifier tracking the number of times the player inputs a correct prediction is increased. If the player's prediction is not correct, the gaming device reveals the first component number and proceeds with the above described sequence for the next unrevealed component number and each subsequent unrevealed component number, if any, until all the component numbers are revealed. When all the component numbers are revealed, the gaming device provides the player an award based on the meter or modifier tracking each generated prediction number, the meter or modifier tracking the number of correct predictions and the meter or modifier tracking the number of times a generated prediction number matches a component number and the high-low game ends. In this embodiment, the player is provided an award based on a plurality of high/low prediction sequences.

Referring now to FIGS. 4A to 4E, one embodiment of the high-low game of the present invention provides a screen or display 200 wherein the player is enabled to shake a virtual die 202 to generate and display a first prediction number 204 of six. As described above, in this embodiment, the generated first prediction number 204 is awarded to the player and displayed as the first component number 206 or first digit of the target number. In this embodiment, a prediction number meter or modifier 208 is increased by six. A meter or modifier tracking the number of times a prediction number matches a component number 210 and a meter or modifier tracking the number of times the player inputs a correct prediction 212 both start the high-low game at a default number of one. It should be appreciated that one, all or any combination of the three meters may begin the high-low game at randomly determined or predetermined default numbers. A current award display 214 of six based on a combination of the three meters 208, 210 and 212 is displayed to the player.

Figure 4A:
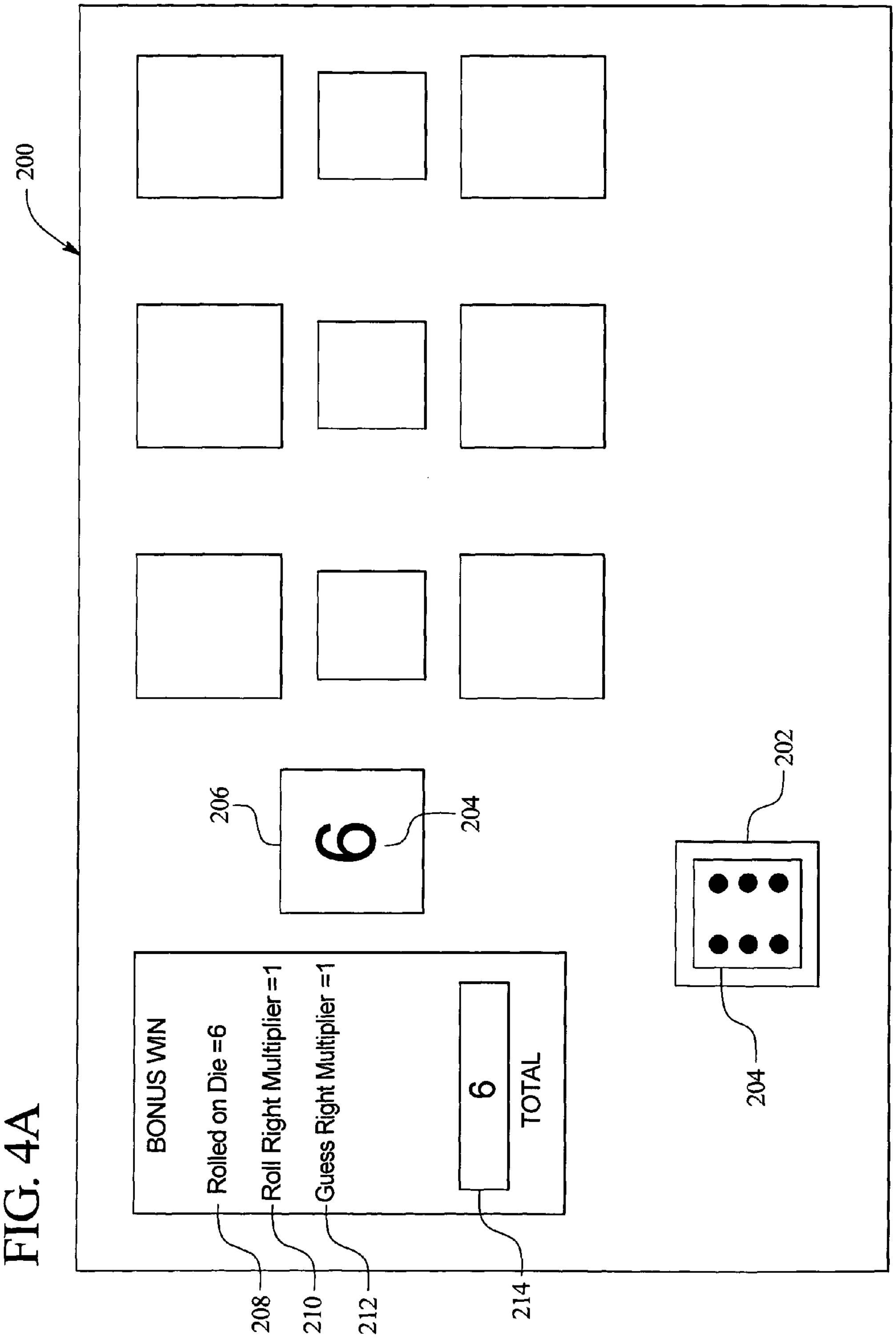
FIGS. 4A, 4B, 4C, 4D and 4E are front elevational views of an alternative embodiment of the present invention illustrating a player predicting whether a plurality of component numbers of a target number are higher or lower than a prediction number.
Figure 4B:
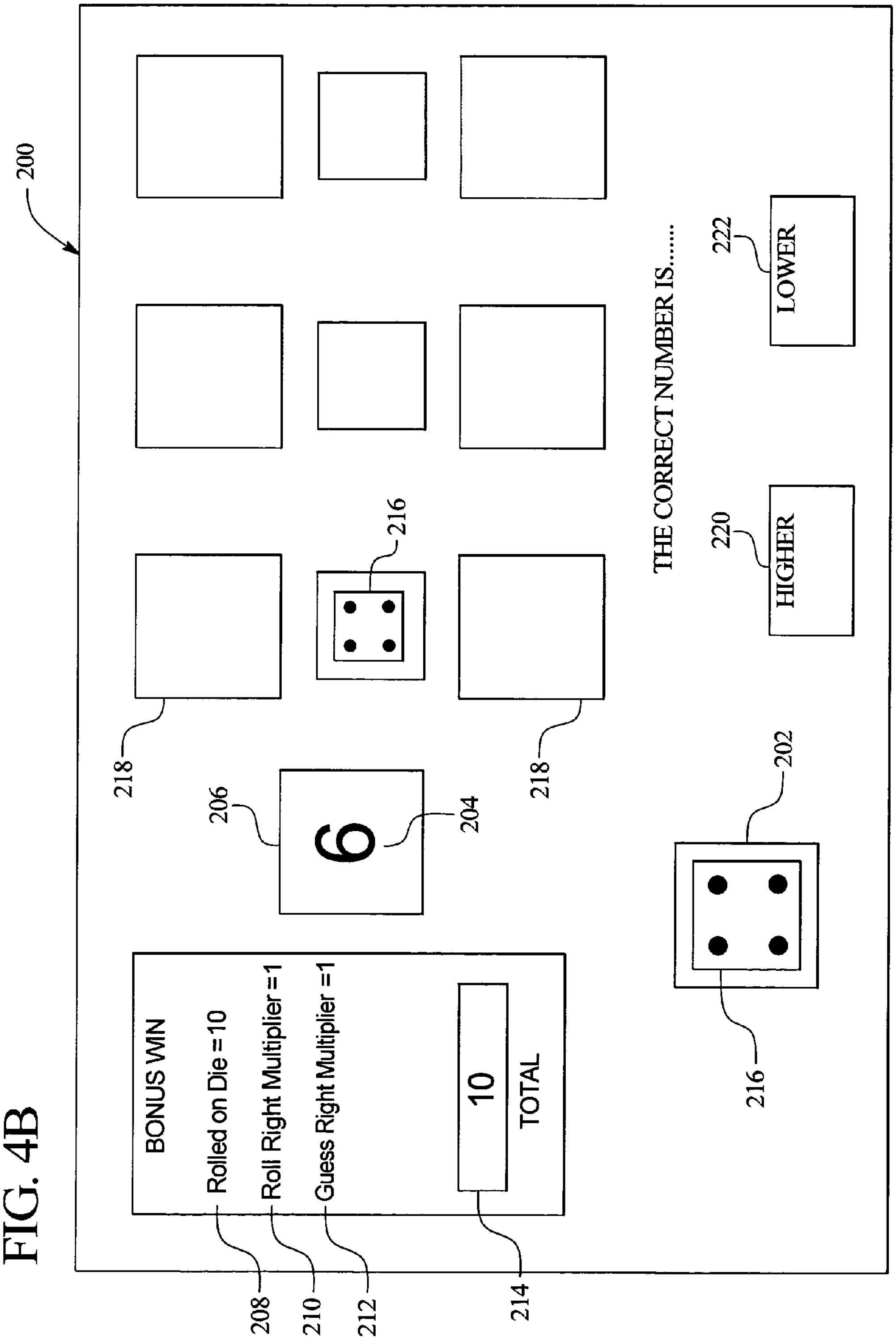

As illustrated in FIG. 4B, once the first component number of the target number is revealed to the player, the gaming device selects a second component number 218 and generates a second prediction number 216 of four as described above. As the second prediction number of four does not match the second component number (i.e., the second digit of the target number), the player is enabled to input a prediction of whether the second component number is higher or lower than the generated prediction number using a higher selector 220 and a lower selector 222. It should be appreciated that the prediction meter 208 is increased by four to a total of ten to reflect the generated second prediction number 216. Accordingly, the current award display 214 is increased to ten to reflect this change.

Figure 4C:
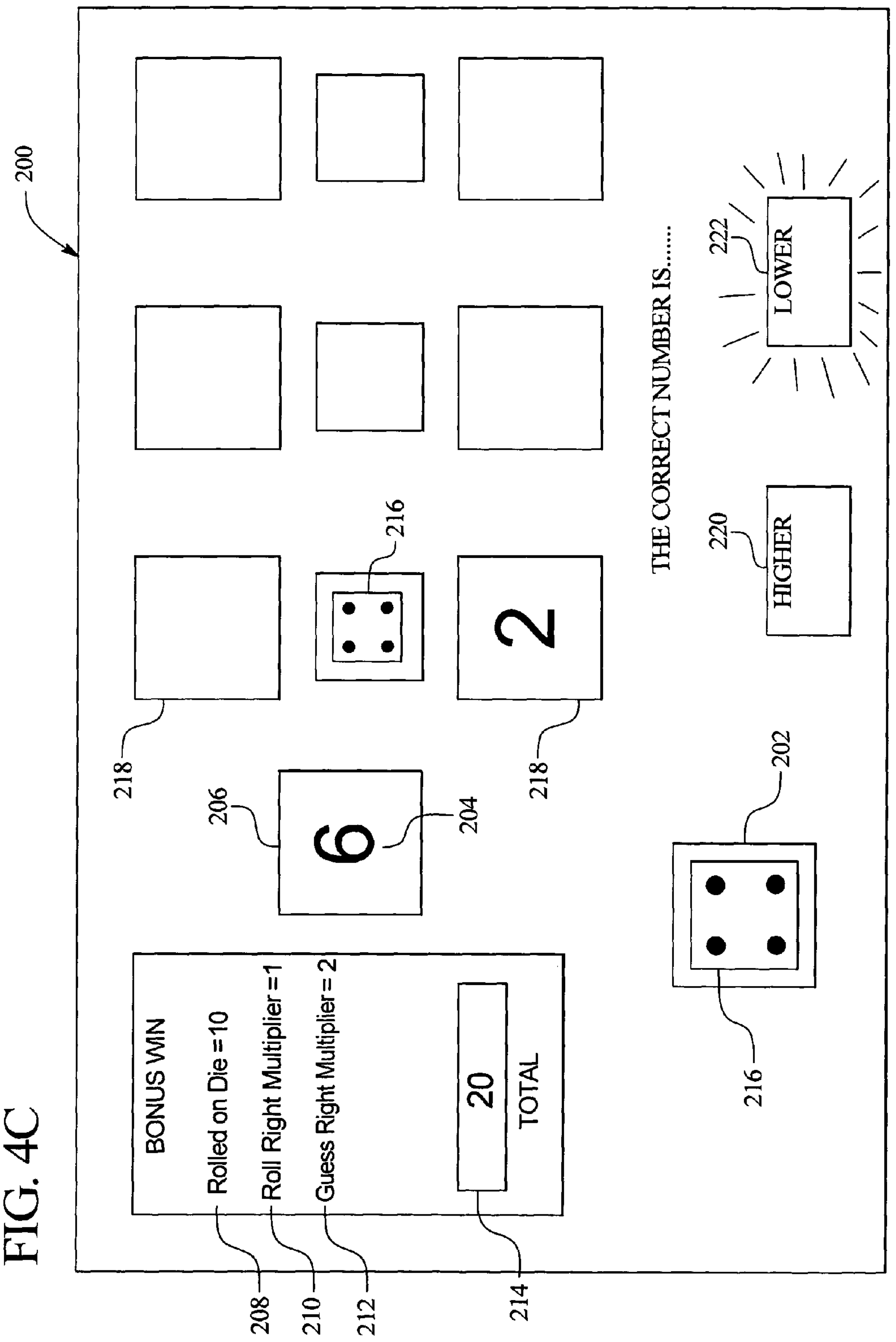

As illustrated in FIG. 4C, the player selected, as indicated by the highlighted lower selector 222, that the second component number was lower than the second prediction number of four. The gaming device reveals the second component number which illustrates that the player's selection was correct because the second component number 218 of two is lower than the second prediction number 216. Accordingly, the correct prediction meter 212 is increased by one to two and the current award display 214 is modified to twenty to reflect this change.

Figure 4D:
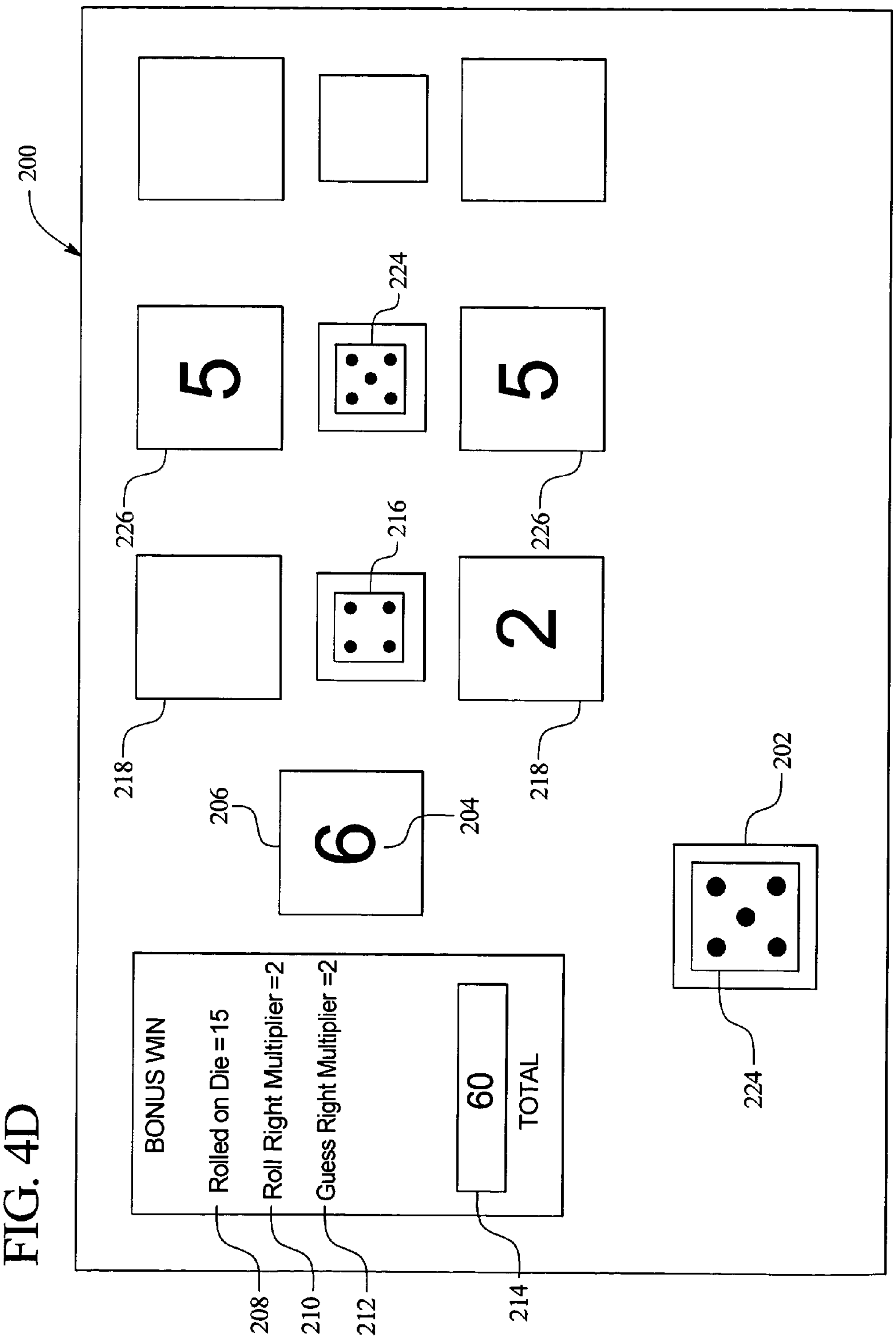

As illustrated in FIG. 4D, the gaming device selects a third component number 226 and generates a third prediction number 224 of five. As the third prediction number 224 matches the third component number 226 (i.e., the third digit of the target number), the third component number 226 is revealed to the player. The meter tracking the number of times a prediction number matches a component number 210 is increased by one to two and the prediction meter 208 is increased by five to a total of fifteen to reflect the generated third prediction number 224. Accordingly, the current award display 214 is increased to sixty to reflect these changes.

Figure 4E:
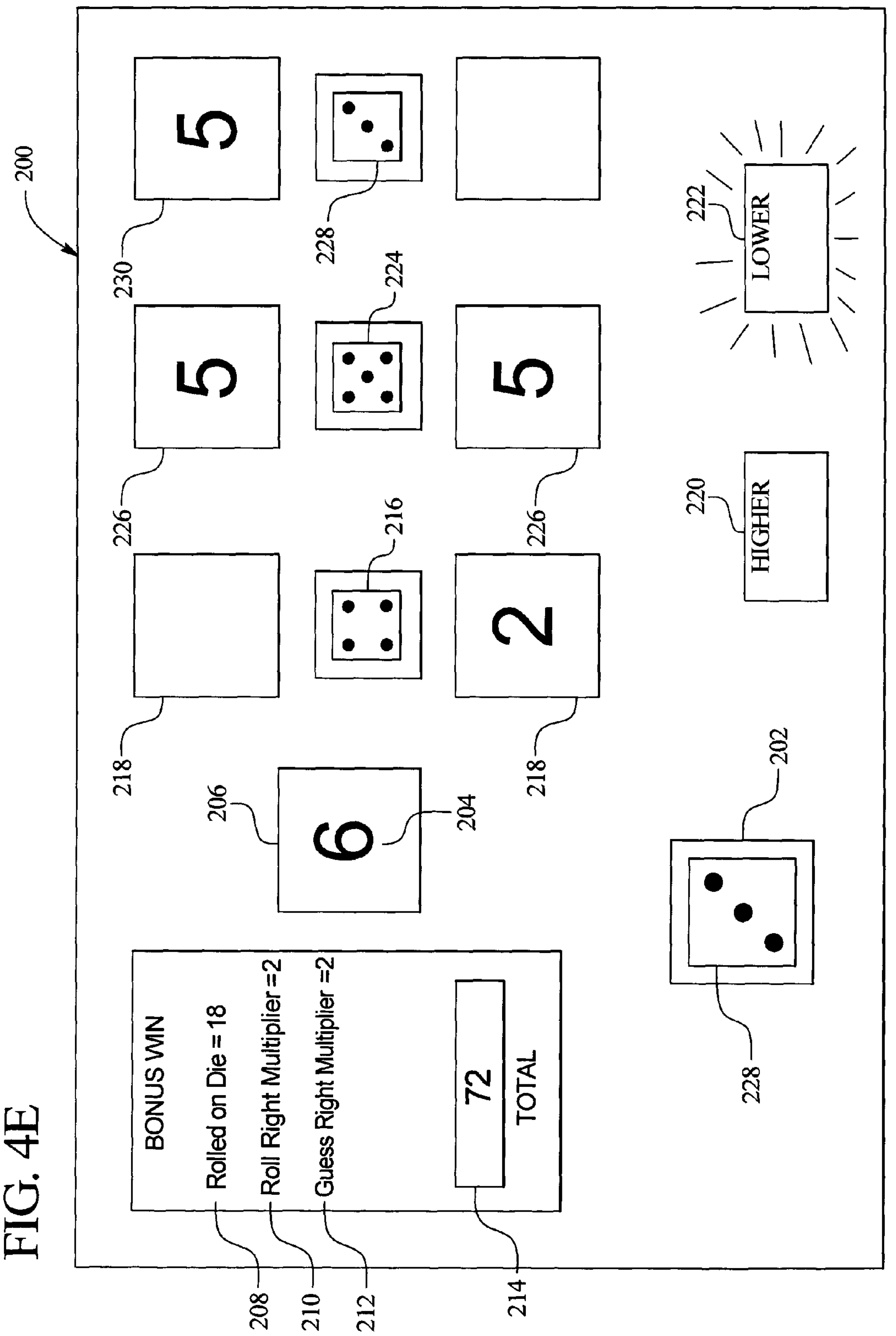

FIG. 4E illustrates this embodiment of the high-low game after the player has unsuccessfully predicted whether a fourth component number 230 of five was higher or lower than a fourth prediction number 228 of three. As the player's prediction was incorrect the correct prediction meter 212 was not increased. However, the prediction meter 208 was increased by three to a total of eighteen to reflect the generated fourth prediction number 228 and accordingly, the current award display 214 was increased to seventy-two to reflect this change.

At this point in the game, since each component number of the target number is revealed to the player, the gaming device provides the player the total award currently displayed in the current award display 214 and the high-low game ends.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming device comprising:

at least one display device;

at least one input device;

at least one processor; and at least one memory device which stores a plurality of instructions, which when executed by the at least one processor, cause the at least one processor to operate with the at least one display device and the at least one input device, for each play of a game, to:

(a) select one of a plurality of component symbols;

(b) designate one of a plurality of prediction symbols;

(c) display said designated prediction symbol to a player;

(d) change a prediction symbol modifier as a result of said displayed prediction symbol;

(e) change a separate match symbol modifier if said prediction symbol matches said selected component symbol;

(f) if said prediction symbol does not match said selected component symbol:

(i) form at least two symbol sets based on said prediction symbol, wherein one of said symbols sets includes the selected component symbol;

(ii) enable the player to input a prediction of which formed symbol set includes the selected component symbol;

(iii) display the selected component symbol to the player; and (iv) change a separate correct symbol set prediction modifier if the player correctly picked which symbol set includes the selected component symbol;

(g) repeat steps (a) to (f) until each of said plurality of component symbols is displayed, wherein for each of the plurality of changes of said prediction symbol modifier, said prediction symbol modifier is changed regardless of whether said prediction symbol matches said selected component symbol and regardless of whether the player correctly picked which symbol set includes the selected component symbol; and (h) cause an award to be provided to the player, said award based on a mathematical operation applied to said prediction symbol modifier, said match symbol modifier and said correct symbol set prediction modifier.

2. The gaming device of claim 1, wherein at least one of said prediction symbols matches said selected component symbol.

3. The gaming device of claim 1, wherein said component symbols are numbers from a range of numbers.

4. The gaming device of claim 1, wherein said plurality of component symbols form a target symbol.

5. The gaming device of claim 1, wherein said prediction symbol modifier is increased based on said displayed prediction symbol.

6. The gaming device of claim 1, wherein said match symbol modifier is increased if said prediction symbol matches said selected component symbol.

7. The gaming device of claim 1, wherein said correct symbol set prediction modifier is increased if the player correctly picks which symbol set includes the selected component symbol.

8. A gaming device comprising:

an input device; and a display device configured to display a primary wagering game operable upon a wager by a player, wherein after each occurrence of a triggering event associated with said primary wagering game:

(a) one of plurality of component symbols is selected;

(b) one of plurality of prediction symbols is designated;

(c) said display device is caused to display said designated prediction symbol to the player;

(d) a prediction symbol modifier is changed based on said displayed prediction symbol;

(e) a separate match symbol modifier is changed if said prediction symbol matches said selected component symbol;

(f) if said prediction symbol does not match said selected component symbol:

(i) at least two symbol sets are formed based on said prediction symbol, wherein one of said symbols sets includes the selected component symbol;

(ii) the player is enabled to input a prediction of which formed symbol set includes the selected component symbol;

(iii) said display device is caused to display the selected component symbol to the player; and (iv) a separate correct symbol set prediction modifier is changed if the player correctly picked the symbol set which includes the selected component symbol;

(g) steps (a) to (f) are repeated until said display device is caused to display each of said plurality of component symbols, wherein for each of the plurality of changes of said prediction symbol modifier, said prediction symbol modifier is changed regardless of whether said prediction symbol matches said selected component symbol and regardless of whether the player correctly picked which symbol set includes the selected component symbol; and (h) an award based on a mathematical operation applied to said prediction symbol modifier, said match symbol modifier and said correct symbol set prediction modifier is provided to the player.

9. The gaming device of claim 8, wherein at least one of said prediction symbols matches said selected component symbol.

10. The gaming device of claim 8, wherein said component symbols are numbers from a range of numbers.

11. The gaming device of claim 8, wherein said plurality of component symbols form a target symbol.

12. The gaming device of claim 8, wherein said prediction symbol modifier is increased based on said displayed prediction symbol.

13. The gaming device of claim 8, wherein said match symbol modifier is increased if said prediction symbol matches said selected component symbol.

14. The gaming device of claim 8, wherein said correct symbol set prediction modifier is increased if the player correctly picks which symbol set includes the selected component symbol.

15. A gaming device comprising:

at least one display device;

at least one input device;

at least one processor; and at least one memory device which stores a plurality of instructions, which when executed by the at least one processor, cause the at least one processor to operate with the at least one display device and the at least one input device, for each play of a game, to randomly select a plurality of component symbols from a plurality of symbols, and for each selected component symbol to:

(a) designate one of said plurality of symbols as a prediction symbol;

(b) display said designated prediction symbol to a player;

(c) cause an award to be provided to the player if said prediction symbol matches said selected component symbol, said award based on a mathematical operation applied to said selected component symbol and one of a plurality of different match symbol modifiers, wherein each time said prediction symbol matches said selected component symbol the award is based on a different one of said match symbol modifiers; and (d) if said prediction symbol does not match said selected component symbol:

(i) form at least two symbol sets based on said prediction symbol, wherein one of said symbol sets includes the selected component symbol and each of said symbol sets include zero, one or a plurality of said symbols;

(ii) display the symbols from the symbol set including the selected component symbol;

(iii) enable the player to try to pick the selected component symbol by picking one of the displayed symbols;

(iv) display the selected component symbol to the player; and (v) cause an award to be provided to the player if the player correctly picked the selected component symbol, said award based on a mathematical operation applied to said selected component symbol and one of a plurality of different correct symbol prediction modifiers, wherein each time the player correctly picks the selected component symbol, the award is based on a different one of said correct symbol prediction modifiers.

16. The gaming device of claim 15, wherein at least one of said prediction symbols matches said selected component symbol.

17. the gaming device of claim 15, wherein said symbols are numbers from a range of numbers.

18. The gaming device of claim 15, wherein said plurality of component symbols form a target symbol.

19. The gaming device of claim 18, wherein said processor is operable to initially display at least one of said component symbols of said determined target symbol.

20. A gaming device comprising:

an input device; and a display device configured to display a primary game operable upon a wager by a player, wherein after each occurrence of a triggering event associated with said primary wagering game, at least one of a plurality of component symbols is randomly selected from a plurality of symbols, and for each selected component symbol:

(a) one of said plurality of symbols is designated as a prediction symbol;

(b) said display device is caused to display said designated prediction symbol to the player;

(c) an award is provided to the player if said prediction symbol matches said selected component symbol, said award is based on a mathematical operation applied to said selected component symbol and one of a plurality of different match symbol modifiers, wherein each time said prediction symbol matches said selected component symbol, the award is based on a different one of said match symbol modifiers; and (d) if said prediction symbol does not match said selected component symbol:

(i) at least two of a plurality of symbol sets are formed based on said prediction symbol, wherein one of said symbols sets includes the selected component symbol and each of said plurality of symbol sets includes zero, one or a plurality of said symbols;

(ii) said display device is caused to display the symbols from the symbol set including the selected component symbol;

(iii) the player is enabled to try to pick the selected component symbol by picking one of the displayed symbols;

(iv) said display device is caused to display the selected component symbol to the player; and (v) an award is provided to the player if the player correctly picked the selected component symbol, said award is based on a mathematical operation applied to said selected component symbol and one of a plurality of different correct symbol prediction modifiers, wherein each time the player correctly picks the selected component symbol, the award is based on a different one of said correct symbol prediction modifiers.

21. The gaming device of claim 20, wherein at least one of said prediction symbols matches said selected component symbol.

22. A gaming device comprising:

at least one display device;

at least one input device;

at least one processor; and at least one memory device which stores a plurality of instructions, which when executed by the at least one processor, cause the at least one processor to operate with the at least one display device and the at least one input device, for each play of a game, to:

(a) determine a target number, said target number formed from a plurality of component numbers, wherein each component number is one of a plurality of numbers from a range of numbers; and (b) randomly select at least one of said component numbers of said determined target number and for each selected component number to:

(i) designate one of said plurality of numbers as a prediction number, (ii) display said designated prediction number to a player, (iii) cause an award to be provided to the player if said pediction number matches said selected component number, said award based on a mathematical operation applied to said selected component number and one of a plurality of different match number modifiers, wherein a greater one of said match number modifiers is used for each provided award, and (iv) if said prediction number does not match said selected component number:

(A) form one of a plurality of number sets based on said prediction number, wherein said number set includes zero, one or a plurality of said numbers and said number set includes the selected component number, (B) enable the player to pick one of the numbers from the formed number set including the selected component number, (C) display the selected component number, and (D) cause an award to be provided to the player if the player correctly picks the selected component number, said award based on a mathematical operation applied to said selected component number and one of a plurality of different correct number prediction modifiers, wherein each time the player correctly picks the selected component number, the award is based on a different one of said correct number prediction modifiers.

23. A gaming device comprising:

at least one display device;

at least one input device;

at least one processor; and at least one memory device which stores a plurality of instructions, which when executed by the at least one processor, cause the at least one processor to operate with the at least one display device and the at least one input device, for each play of a game, to:

(a) select one of a plurality of component numbers;

(b) designate one of a plurality of prediction numbers;

(c) display said designated prediction number to a player;

(d) change a prediction number modifier based on said displayed prediction number;

(e) change a separate match number modifier if said prediction number matches said selected component number;

(f) if said prediction number does not match said selected component number:

(i) form at least two number sets based on said prediction number, wherein one of said sets includes the selected component number;

(ii) enable the player to input a prediction of which formed number set includes the selected component number;

(iii) display the selected component number to the player; and (iv) change a separate correct number set prediction modifier if the player correctly picked which number set includes the selected component number;

(g) repeat steps (a) to (f) until each of said plurality of component numbers is displayed, wherein for each of said plurality of changes of said prediction number modifier, said prediction number modifier is changed regardless of whether said prediction number matches said selected component number and regardless of whether the player correctly picked which number set includes the selected component number; and (h) cause an award to be provided to the player, said award based on a mathematical operation applied to said prediction number modifier, said match number modifier and said correct number set prediction modifier.

24. The gaming device of claim 23, wherein said prediction number modifier is increased based on said displayed prediction number.

25. The gaming device of claim 23, wherein said match number modifier is increased if said prediction number matches said selected component number.

26. The gaming device of claim 23, wherein said correct number set prediction modifier is increased if the player correctly picks which formed number set includes the selected component number.

27. A method of operating a gaming device including a plurality of instructions and a game, for each play of the game, said method comprising:

(a) causing at least one processor to execute the plurality of instructions to randomly select one of a plurality of component symbols;

(b) causing said at least one processor to execute the plurality of instructions to generate a prediction symbol;

(c) causing at least one display device to display said prediction symbol;

(d) providing an award to a player if the generated prediction symbol matches the selected component symbol, wherein said award is based on a mathematical operation applied to said selected component symbol and one of a plurality of different match symbol modifiers, wherein each time said prediction symbol matches said selected component symbol, the award is based on a different, greater one of said match symbol modifiers;

(e) if the generated prediction symbol does not match the selected component symbol:

(i) causing said at least one processor to execute the plurality of instructions to form a symbol set based on the generated prediction symbol, wherein said symbol set includes the selected component symbol;

(ii) causing the at least one display device to display said symbol set that includes the selected component symbol;

(iii) enabling the player to pick one of the symbols from the symbol set which includes the selected component symbol; and (iv) providing the player the award if the player's picked symbol is the selected component symbol, said award based on a mathematical operation applied to said selected component symbol and one of a plurality of different correct symbol prediction modifiers, wherein each time the player correctly picks the selected component symbol, the award is based on a different, greater one of said correct symbol prediction modifiers;

(f) causing the at least one display device to display the selected component symbol; and (g) causing said at least one processor to execute the plurality of instructions to repeating steps (a) to (f) until each of said plurality of component symbols is displayed.

28. The method of claim 27, wherein at least one of the selected symbols matches one of the selected component symbols.

29. The method of claim 27, which is provided to the player through a data network.

30. The method of claim 29, wherein the data network is an internet.

* * * * *

UNITED STATES PATENT AND TRADEMARK OFFICE

CERTIFICATE OF CORRECTION

PATENT NO. : 7,588,494 B2
APPLICATION NO. : 10/655871
DATED : September 15, 2009
INVENTOR(S) : Hughs-Baird et al.

It is certified that error appears in the above-identified patent and that said Letters Patent is hereby corrected as shown below:

In Claim 8, Column 19, Line 8, change “(b) one of plurality” to --(b) one of a plurality--.

Signed and Sealed this

Seventeenth Day of November, 2009

David J. Kappos
*Director of the United States Patent and Trademark Office*

UNITED STATES PATENT AND TRADEMARK OFFICE

CERTIFICATE OF CORRECTION

PATENT NO. : 7,588,494 B2
APPLICATION NO. : 10/655871
DATED : September 15, 2009
INVENTOR(S) : Hughs-Baird et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1300 days.

Signed and Sealed this

Twenty-first Day of September, 2010

David J. Kappos

*Director of the United States Patent and Trademark Office*